United States Patent [19]

Hardy et al.

[11] Patent Number: 5,448,624
[45] Date of Patent: Sep. 5, 1995

[54] TELEPHONE NETWORK PERFORMANCE MONITORING METHOD AND SYSTEM

[75] Inventors: William C. Hardy, Dallas, Tex.; Thomas H. Johnson, Jr., Columbia, Md.

[73] Assignee: MCI Communications Corporation, Washington, D.C.

[21] Appl. No.: 2,876

[22] Filed: Jan. 14, 1993

Related U.S. Application Data

[63] Continuation-in-part of Ser. No. 570,778, Aug. 22, 1990, Pat. No. 5,241,584.

[51] Int. Cl.6 .......................... H04M 1/64; H04M 3/22
[52] U.S. Cl. ............................. 379/67; 379/34; 379/69; 379/113; 379/6; 379/23; 379/133; 379/135; 379/372; 379/399
[58] Field of Search ............... 379/67, 88, 89, 69, 379/79, 113, 34, 133, 134, 135, 372, 386, 399, 5, 6, 23, 31

[56] References Cited

U.S. PATENT DOCUMENTS

| | | |
|---|---|---|
| 4,599,493 | 7/1986 | Cave ...................... 379/309 |
| 4,602,129 | 7/1986 | Matthews et al. ........... 379/88 |
| 4,797,911 | 1/1989 | Szlam et al. ............... 379/216 |
| 4,858,120 | 8/1989 | Samuelson ................. 379/113 |
| 5,023,906 | 6/1991 | Novas ..................... 379/386 |

Primary Examiner—James L. Dwyer
Assistant Examiner—Fan Tsang
Attorney, Agent, or Firm—Pollock, Vande Sande & Priddy

[57] ABSTRACT

The present invention automatically initiates a telephone call to a given destination. At the same time, the progress of the call is monitored. The time of a ring back and voice answer received from the destination are recorded to an output file. At the end of the voice answer, a pre-recorded voice message is sent by the system to the person answering at the destination. Thereafter, the recorded data is used to determine the response time for that particular telephone destination. A plurality of destinations can be tested. A second embodiment of the present invention provides for the interactive correspondence between a remote evaluation unit and a called destination and the measurement of the performance characteristics of the telephone network.

14 Claims, 28 Drawing Sheets

TELEPHONE NETWORK PERFORMANCE MONITORING METHOD AND SYSTEM

This is a continuation-in-part of application serial No. 570,778, now U.S. Pat. No. 5,241,584 filed Aug. 22, 1990.

FIELD OF THE INVENTION

The present invention relates to call progress evaluation of a telephone network, and more particularly the utilization of multiple evaluation units each of which independently monitors call progressing of the telephone network and a central station for collecting the data from the different evaluation units to generate different reports pertaining to the service quality of the network. The present invention also relates to a method for achieving the above.

BACKGROUND OF THE INVENTION

When a person picks up a telephone and dials a particular number, the dial tones which are input to the telephone are sent to one telephone switch which may make a connection with another telephone switch for directing the call to the desired number. An amount of time must elapse between when the caller inputs the last digit to his telephone and when he receives a ring back from the destination telephone. This elapsed time is known as post-dial delay.

The post-dial delay is a characteristic (parameter) of a telephone network, in that it is different for different telephone connections. In fact, a post-dial delay is a function of the following: the speed with which a user dials his telephone; the type of connection to a long distance switch; the path through which the call is routed from the caller telephone to the receiver's telephone; and the type of PBX the user's telephone or the receiver telephone is connected to, if private branch exchanges are involved.

With reference to FIG. 1, a typical connection between caller telephone 2 and a receiver telephone 4 is shown. As was discussed previously, the digits that a caller inputs to his telephone are sent to a switch 6 and routed across telephone network line 8 to another switch 10, from whence the call is further routed to receiver telephone 4 via line 12. Ordinarily, the post-dial delay comprises the time between the input of the last digit by the caller and the ring back, from telephone 4. Thus, by measuring the post-dial delay, the time needed for a signal to cascade from telephone 2 to telephone 4 can be ascertained. This measurement of the post-dial delay is a characteristic of the telephone network which includes switches 6, 10 and the line leading from telephone 2 to switch 6 and lines 8 and 12.

Oftentimes, however, a user may want to obtain information from an operator or make an operator assisted call. This is done by routing the call to a switch exchange, such as 14, where a number of operators are located. Inasmuch as the number of incoming calls are likely to exceed the number of operators available, the calls are first sent to an auxiliary switch 16 and held in a queue 16a, so that the incoming calls are answered by the operators in a first in first out manner. Thus, when a caller attempts to call an operator, the call is first routed to auxiliary switch 16 and a ring back is provided thereby. After a few rings, an available operator would answer the call and assist the caller. This is all well and good so long as there are sufficient number of operators to handle the incoming calls. However, if there are insufficient operators, queue 16a can grow quite lengthy and the caller will be on hold for a long time. When this occurs, most callers would just hang up. Consequently, charges that otherwise would have been earned from operator assisted calls are lost.

Likewise, when a caller is making a credit card call, in most instances the call is routed, after switch 6 and switch 10, to credit card switch 18 via line 20. A signal such as a bong tone is then provided by credit card switch 18 back to telephone 2 to inform the caller to input the desired credit card number. If the correct credit card number is input, usually the call is routed to telephone 4 via line 22. However, if the wrong credit card number was input, usually after several attempts, the call is routed to switch exchange 14 via line 24, so that an operator can intercept the call. If the correct information can then be obtained at that time, the call is routed from switch exchange 14 to line 26 and then telephone 4. Like the queue formed at auxiliary switch 16, if the caller has to wait an inordinate amount of time before an operator answers, chances are the caller will hang up. Accordingly, potential charges are lost.

Thus, there is a need to provide a sufficient number of available operators at switch exchange 14 to handle the incoming calls. But insofar as the demand for operator assisted calls varies throughout the day—for example the demand is much lower at 3:00 a.m. than at 11:00 a.m. or 1:00 p.m.—and the cost of maintaining a large number of idle operators is substantial, the number of available operators must be balanced against the various demand call patterns occurring throughout the day.

There is also a need to continuously monitor the progress of the call to the destination to which the call is placed so that evaluation can be made on the service quality and the responsiveness of the particular destination, and the characteristics of the network.

SUMMARY OF THE PRESENT INVENTION

The method and apparatus of the present invention can be used to determine the time it takes for an operator (or a person) to answer a call so that an optimal number of operators is utilized at a switch exchange at a particular time of day, in order to reduce the queue time for a caller to reach an operator.

To achieve this end, the present invention uses a computer controlled system, interfaced with the telephone network being evaluated, to measure the time required for an operator to answer a call. In particular, dial tones for effecting a call to a chosen destination, for example a switch exchange, are generated by a dual tone multi-frequency transceiver (DTMF) and sent though a telephone line interface unit to a conventional telephone line. Upon reaching the destination, but before being answered by an operator, the call, as was discussed before, is placed in an auxiliary switch and put in queue. A ring back signal is then fed from the auxiliary switch to the system via the telephone line interface.

A call progress detector, in the meantime, watches the progress of the call and discriminates the received audible tones, for example as a ring back. The time elapsed before the ring back is received is recorded. When an operator answers, the voice response is detected as such by a voice detect circuit and the time at which a voice answer is received is also recorded. Upon detection of the completion of the voice answer, a prerecorded voice message is transmitted by a PCM CODEC transceiver, via the telephone line interface, to the switch exchange to inform the operator that the call is a test and no assistance is needed. Of course, other types of voice messages can also be sent. After that, the system hangs up on the pre-chosen destination and attempts can be made on other chosen destinations throughout the telephone network.

The respective operations of the different components of the system are controlled by a processor, for example a personal computer (PC) such as an IBM PS/2, model 30. The different components of the system can be fabricated onto a printed circuit board which can be inserted into an available expansion slot in the PC. A buffer for providing interface between the PC and the different components is also built into the system.

By thus measuring the time response of operators at different switch exchanges, characteristics of the network are determined and taken into consideration to evaluate the optimal balance between the number of available operators and the time which a caller has to wait before being assisted by one of the available operators.

A second embodiment of the present invention deals with measuring the characteristics of the network by collecting data reflective of characteristics of each individual destination to which calls are placed. To provide for such measurement, not only does the second embodiment apparatus measure the progress tones and responses from the different destinations, it also interactively corresponds with those destinations by detecting the particular type of response therefrom and replying to that response in an appropriate manner.

To accomplish this interactive correspondence, the signatures of various possible responses are stored in the memory of the second embodiment apparatus. Upon detection of a particular response, a command string appropriate for corresponding with that response is used by the system to interactively correspond with the destination. For example, if, as before, a voice of an operator (or some other person) is detected, instead of just replaying a message to the operator, a request asking the operator to perform certain operations, as for example pressing particular keys on the key pad, would ensue.

To provide for such interactive capability, the second embodiment, instead of voice detect circuit, uses a number of programmable filters for detecting the various types of responses. In addition, a separate on-board processor and co-processor are added to the printed circuit board, as fabricated for the first embodiment, to provide greater control for the system of the second embodiment.

The data representative of the responses are recorded by a number of the evaluation units, each of which is polled by a central network server, so that the data can be uploaded to the server. To enhance transport and storage, the data may be compressed. Once a given period (for example once a day), or when the network server has collected sufficient data from the evaluation units, it would generate reports that provide the management with an analysis of the performance characteristics of the network, and each particular destination. Such report generation may be performed by a computer remotely connected to the network server.

Of course, the inherent flexibility of the signal response signatures provided by the programmable filters also allows detection of foreign call progress signals, thereby allowing testing of the phone service in a foreign country by placing a second embodiment system in that foreign country. In addition, testing of international phone calls and services from the United States can be effected.

It is, therefore, an objective of the present invention to provide a system that automatically measures the response time by an operator, at a given switch exchange, so that an optimal number of available operators may be present at that switch exchange at a given time of the day.

It is another objective of the present invention to provide a system that automatically maintains a record of response times for different switch exchanges.

It is yet another objective of the present invention to provide a plurality of evaluation units each of which can interactively correspond with a called destination, and collect data representative of the different responses from the destination.

It is also an objective of the present invention to provide a telephone quality measurement system in which a centrally located network server can download information collected from a plurality of remotely situated evaluation units and generate reports that reflect the collected information so that management can accurately assess the performance of the different destinations, and the characteristics of the network.

BRIEF DESCRIPTION OF THE FIGURES

The above-mentioned objectives and advantages of the present invention will become more apparent and the invention itself will be best understood by reference to the following description of an embodiment of the invention taken in conjunction with the accompanying drawings, wherein:

FIGS. 3F and 3F-1 in combination provide a detailed flow chart of block 3f of the FIG. 3 top level flow chart;

FIGS. 5 and 5-1 in combination provide a top level flow chart illustrating an overall view of the operational steps of the second embodiment system of the present invention;

FIGS. 5E, 5E-1, 5E-2 and 5E-3 in combination provide a detailed flow chart of block 5E of the FIG. 5 top level flow chart;

FIGS. 5F and 5F-1 in combination provide a detailed flow chart of block 5F of the FIG. 5 top level flow chart;

FIGS. 5G and 5G-1 in combination provide a detailed flow chart of block 5G of the FIG. 5 tope level flow chart:

FIG. 5H-1 is a detailed flow chart of block 5HA of the detailed FIG. 5tt flow chart;

FIG. 5H-2 is a detailed flow chart of block 5HB of the FIG. 5H detailed flow chart.

DETAILED DESCRIPTION OF THE PRESENT INVENTION

Figure 2:
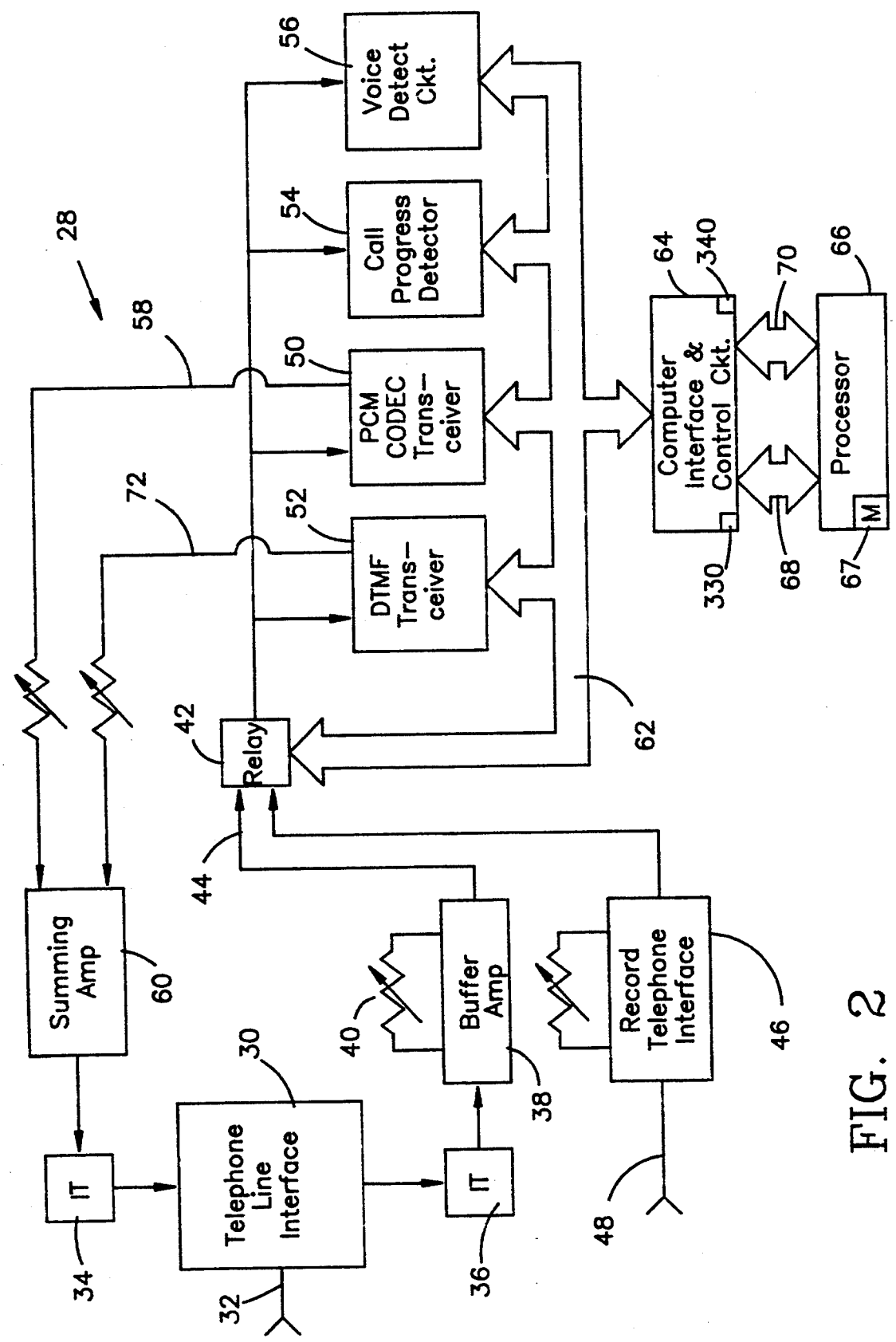
FIG. 2 is a block diagram of the hardware components of a first embodiment of the present invention.

As shown in FIG. 2, the first embodiment of the apparatus of the present invention (i.e. system board 28) has a telephone line interface 30, which may be a Motorola MC3401OP Integrated Circuit (IC) chip, for providing an interface between system 28 and a standard telephone line 32. Telephone line interface 30 is powered by current from the telephone line 32. To prevent any potential grounding problems, isolation transformers 34 and 36 are provided at the respective input and output of telephone line interface 30, to isolate the system's transmission and reception.

Basically, telephone line interface 30 takes signals of various levels from phone line 32 and/or the system, translates the signals, splits the transmission and reception signals into separate circuits and feeds the respective signals through isolation transformers 34 and 36 either to telephone line 32 or to the other component circuits of system 28 in the correct format and signal amplitude.

Signals from phone line 32, after having been translated by telephone line interface 30 into signals having the correct format and amplitude, are fed through isolation transformer 36 to a buffer amplifier 38, which has a user adjustable potentiometer 40. By adjusting the gain of buffer amplifier 38 to −2 2dB, assuming that the input line level from isolation transformer 36 is −16 dB maximum, an optimal signal—in the form of audible tones such as ring back or voice—is provided as an output from buffer amplifier 38 to a relay 42.

Relay 42 is a conventional relay that has two modes: record and phone. For normal operation of system 28, relay 42 is set to its phone mode where it funnels the signals provided at the output of buffer amplifier 38, at lines 44, to the rest of the components in system 28. In its record mode, relay 42 is connected to a record telephone interface circuit 46, which has an input 48. Record telephone interface circuit 46 is a conventional circuit connectable via line 48 to a telephone line to allow the recordation of a voice message, to be fed via relay 42 to a pulse code modulation coder and decoder transceiver, i.e. PCM CODEC transceiver 50. Do note that the voice message in practice is first stored in a working memory, for example the RAM of a computer (such as to be discussed processor 66) and eventually stored as a disk file in a resident permanent memory of the computer, i.e. a hard disk for example illustrated as 67 in processor 66.

CODEC transceiver 50 uses a standard digitization scheme to band limit voice frequencies by, for example, 300 and 3300 Hz filters. An analog-to-digital transformation having an equivalent 12 bit accuracy is performed on the voice message, by a "companding" scheme whereby the larger amplitudes are compressed more than the smaller amplitudes, to compress the 12 bit accuracy information into an 8 bit word (u-255 companding). The 8 bit word is then stored in an array resident in processor 66 memory. For the embodiment of the present invention, the information can be retrieved from the array by retrieving file VOICE.DAT. CODEC transceiver 50 is a semiconductor chip manufactured by either the SGS Thompson or National Semiconductor Company having the product number ETC5056, or equivalent. The digitized voice message is output from memory 67 of processor 66 through CODEC transceiver 50 when appropriate as will be described.

Another component of system 28 is a DTMF (dual tone multi-frequency) transceiver 52 that can generate and detect audible tones associated with a telephone network. DTMF transceiver 52 is a 75T2090 semiconductor chip made by Silicon Systems, Inc. of Tustin, Calif. The DTMF transceiver 52 can generate the DTMF dialing tones to initiate a call through phone line 32 and also detect DTMF tones received from phone line 32 such as a bong tone.

Also included in system 28 is a call progress detector 54 having device number NE5900 manufactured by the Signetics Corporation. Functionally, call progress detector 54 continuously monitors the call progress information being fed to system 28 and discriminates the type of information being provided by focussing at a particular frequency band, for example from 300 to 630 Hz, where most of the fundamental energies of the call progress information reside. The respective durations of the incoming signals, which may be dial tone, ring back, busy, or fast busy are recorded. As is well known, dial tone is continuous; ring back has a duration of approximately 1.6 seconds on and 2.2 seconds off; busy has a duration of ½ second on and ½ second off; and fast busy has a duration of a ¼ second on and a ¼ second off. In essence, call progress detector 54 examines the frequency band of interest, looks for the durations of the on and off times and classifies the examined signal as one of the abovenoted tones.

A voice detect circuit 56, also included in system 28, is made from standard operational amplifiers for forming filters having accuracy similar to those in call progress detector 54. The filters in voice detect circuit 56 are set for detection from approximately 750 Hz to 4 KHz in the voice band where most of the energy of the incoming voice signal resides. Voice detect circuit 56 specifically detects a voice answer, which has significant energy within the 750 Hz to 4 KHz band, by way of its high pass filters. When a voice answer is detected, the output from the high pass filters is properly amplified and translated into a digital output to trigger the software to send out the voice message stored in the VOICE.DAT file through CODEC transceiver 50. The voice message is fed via line 58 to a summing amplifier 60, which routes it to isolation transformater 34 and telephone line interface 30, and then telephone line 32. A more detailed description of the interaction between voice detect circuit 56 and CODEC transceiver 50 is given below in the discussion of FIG. 3.

Relay 42, DTMF transceiver 52, CODEC transceiver 50, call progress detector 54 and voice detect circuit 56 are all connected to a bidirectional bus 62. Also connected to bus 62 is a computer interface and control circuit 64 which provides interfacing between the different components (i.e. component chips of system board 28) and processor 66 by way of address bus 68 and data bus 70. Computer interface and control circuit 64, in short, takes the multiple bit address from processor 66 and decodes it to the specific board address (of the system) to allow processor 66 to address and control each of the components. Processor 66, in this embodiment, may be a conventional IBM personal computer and system 28 may be fabricated on an expander board that is mated to one of the available expansion slots in the PC. For example, processor 66, by transmitting the appropriate addresses, can control DTMF transceiver 52 so that audible tones are generated thereby and fed to line 72, summing amplifier 60, phone line 32 and directed to the chosen destination. The level of the signals, on either line 58 or line 72, is adjusted by summing amplifier 60 so that an output signal having a corrected level which is compatible with the level required in the telephone network is fed to phone line 32.

To operate system 28, a program MCIOP.EXE, the operational steps of which are illustrated in FIG. 3 and FIGS. 3a to 3F in flow chart format, is executed. Used along with program MCIOP.EXE are a configuration file, a phone list file and an output file. The configuration file is preferably named CONFIG.DAT, whereas the names for the phone list file and the output file are specified in the second and third lines of the configuration file.

Configuration file CONFIG.DAT has 3 ASCII lines, as illustrated by the example below:
OxffeO
c:phone.dat
c:output.dat The first line of the CONFIG.DAT file contains a two byte hexadecimal number, or an integer number representing the base address of the system board. A base address for the system board is necessary inasmuch as there might be a number of boards plugged into the respective expansion slots of the PC. The second line of the CONFIG.DAT file contains the file name of the phone list file, in this instance called Pt-IONE.DAT. The third line of the CONFIG.DAT file contains the file name of the output file, i.e. OUTPUT.DAT.

An example of a phone list file is shown below.

```
5
.1
.1
9,0-301-595-4266
595-4266
5954266
12345678901234567890123456789012345678901234567890123456789
9,,,1-800-877-8000-12334-89888-989-0-415-432-2222
```

The first line of the phone list file contains an integer number that represents the number of times that the phone list should be cycled through. The second and third lines of the phone list file designate the DTMF on and off times, respectively. For the example phone list file shown, DTMF transceiver 52 would be generating tones of 0.1 second on and 0.1 second off. From line 4 onwards, the phone list file contains different telephone numbers, directed to different destinations, system 28 is to call in order to measure response times. The phone numbers can be up to 50 digits long, can contain the digits 0-9, hyphens, or commas. With the examples shown, each digit produces its corresponding DTMF tone for 0.1 second on and 0.1 second off. All hyphens are ignored. Each comma encountered produces a one second pause.

The output file is automatically created if it does not already exist. If it does, new records are appended to the end of the file. An example of an output file follows later.

Figure 3:
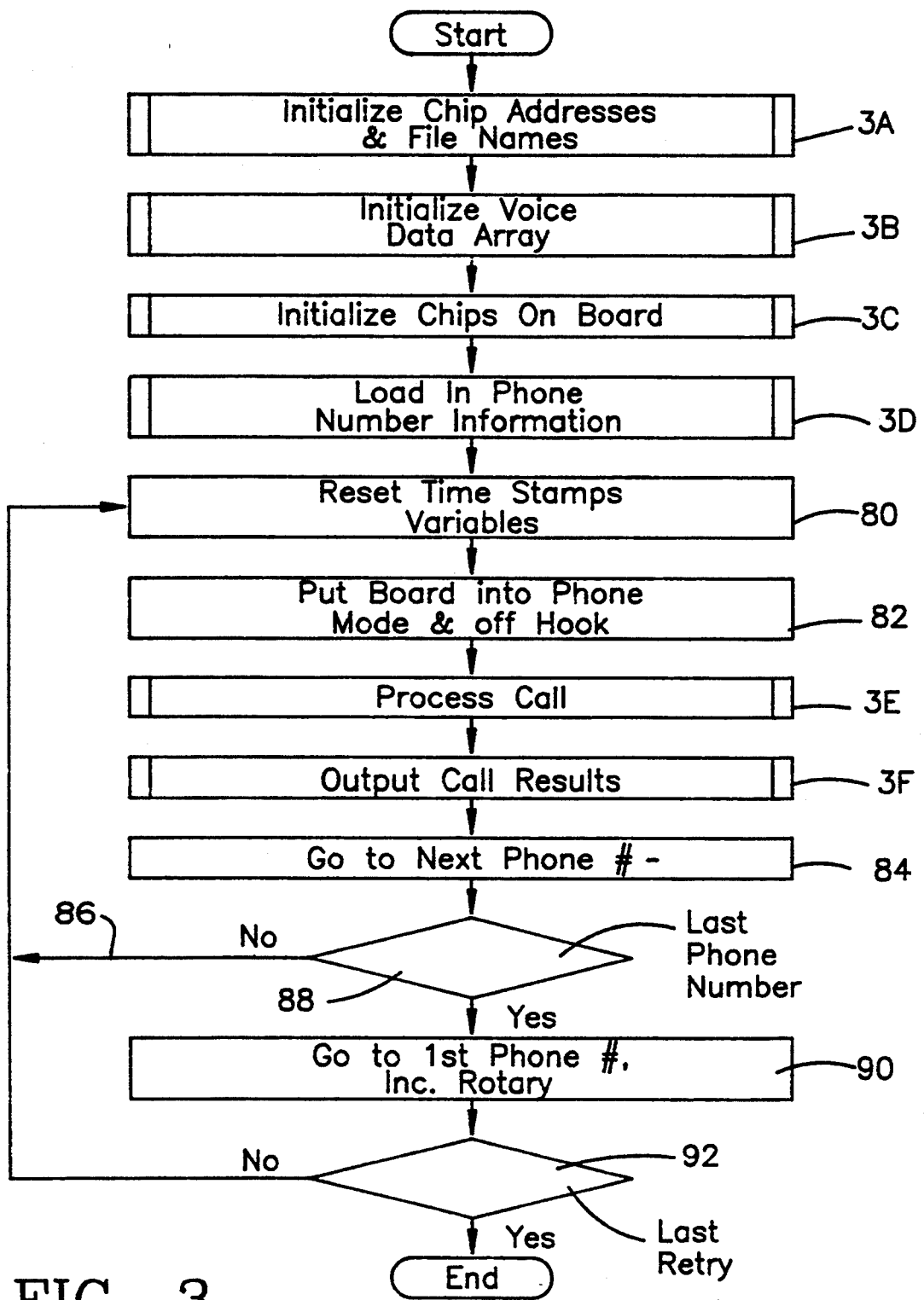
FIG. 3 is a top level flow chart illustrating an overall view of the operational steps of the first embodiment system of the present invention.

With reference to FIG. 3, to operate, system 28 has to be first initiated per steps 3A to 3D.

Figures 3A, 3B:
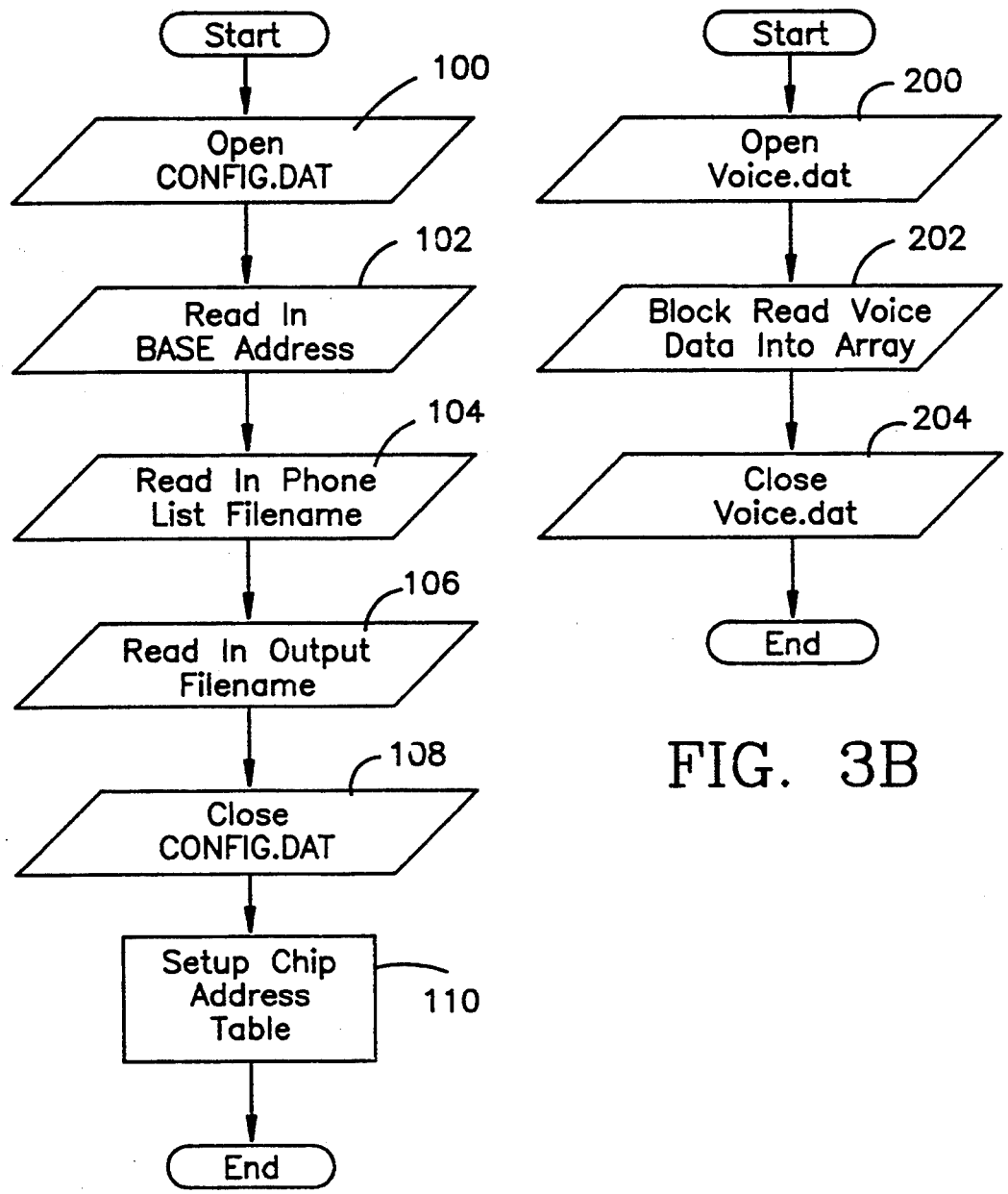
FIG. 3A is a detailed flow chart of block 3a of the FIG. 3 top level flow chart.
FIG. 3B is a detailed flow chart of block 3b of the FIG. 3 top level flow chart.
Figure 3C:
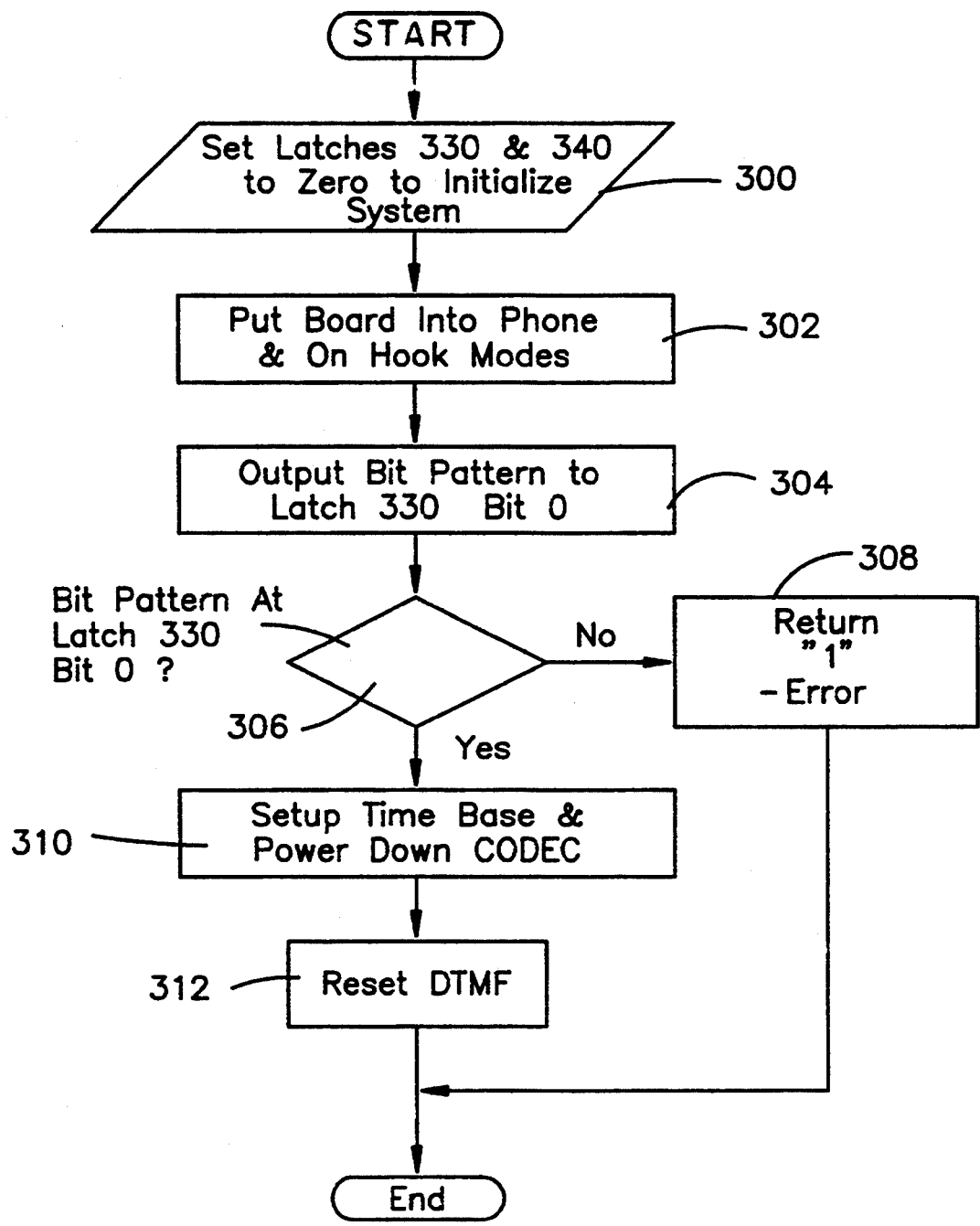
FIG. 3C is a detailed flow chart of block 3c of the FIG. 3 top level flow chart.

With reference to FIG. 3A, the following operations are performed in order to initialize the addresses of the component chips and the file name of system board 28. First, the configure file CONFIG.DAT is opened per operation 100. Next, the base address of the system is read in operation 102. Thereafter, the phone list file name (i.e. PHONE.DAT) is read from the second line of the configuration file by operation 104. The output file name (i.e. OUTPUT.DAT) is then read from line 3 of the configuration file in operation 106. After that, configuration file CONFIG.DAT is closed in operation 108. The addresses of the respective component chips DTMF transceiver 52, CODEC transceiver 50, call progress detector 54 and voice detector circuit 56 are thereafter set in operation 110. By performing operations 100 to 110, processor 66 sets up the appropriate addresses of system 28 (on the board).

Assuming that system board 28 is present, the program proceeds to step 3B to initialize the digitized voice array in processor memory 67. As discussed earlier, a voice message, which lasts approximately 7.5 seconds for this embodiment, after having been appropriately digitized, is recorded by record telephone interface circuit 46 and stored in file VOICE.DAT in processor memory 67. With reference to FIG. 3B, in operation 200, the voice message file VOICE.DAT is opened. The stored data is read in operation 202. After which the voice message file is closed in operation 204. The set up step 3B, in essence, makes sure that there is in fact a voice message available to be played back in response to system 28 receiving a voice answer.

Upon completion of step 3B, the program proceeds to step 3C to initialize the different component chips in the system. To perform step 3C, two control latches 330 and 340 (shown in FIG. 2 to be part of computer interface and control circuit 64) are used to set up the different controls, by interfacing the different component chips with processor 66. To elaborate, all computer actions, for example read and write functions, are initiated by the program. These functions are synchronous and last only for a brief period of time, for example 100 usec for the read cycle and 300 usec for the write cycle. Latches 330 and 340 enable both read and write of the different component chips during the running of the program.

When the latches are set to zero in operation 300, the different component chips of system 28 are initialized. System board 28 is put on hook, i.e. opening a switch in telephone line interface 30 to make sure that phone line 32 is not active during program initialization, and put into phone mode in operation 302, where relay 42 now acts as a direct conduit for funneling information between the different components of system board 28 and phone line 32. All inputs therefore come from telephone line interface 30 at this time. Both of the on hook and phone mode functions are controlled, of course, by latches 330 and 340.

In operation 304, a test is performed to determine whether or not system board 28 is present, or has been securely inserted into an expansion slot in processor 66. In other words, via computer interface and control circuit 64, processor 66 confirms whether system board 28 is in fact present at the appropriate address set up in step 3A. If no confirmation is received, the program should end since no board is perceived to be present.

The test involves the writing of different valued bits (bit patterns) to one of the latches and the reading of the values of the corresponding bits (bit patterns) output from the latch. In essence, if there is a board present, the values of the respective output bits would correspond to the values of the input bits. On the other hand, if there is no board present (or a faulty board), the values of the respective output bits would not correspond to the values of the input bits. The comparison to determine whether there is a correspondence between the write and read bit patterns is made in operation 306. If there is an error, the program proceeds to operation 308, noting the error and quits. If the bit patterns correspond, the program proceeds to operation 310 to set a time base and power down CODEC transceiver 50. A time base is needed insofar as all of the functions determined by system board 28 have to be synchronous.

To set up a time base, a crystal oscillator (not shown) on system board 28 feeds, for example, a 1.536 MHz frequency to a conventional programmable timer, such as an Intel 8254 chip. The programmable timer chip then divides the 1.536 MHz frequency by 192 to get down to the standard time base of 8 KHz (for this example), so that all the component chips on system board 28 run at that frequency. Putting it differently, a signal from phone line 32 is therefore sampled at 8000 times per second, or convened from analog-to-digital every 125 usec. Once the time base is set, to conserve power, CODEC transceiver 50 is powered down in operation 310. In operation 312, DTMF transceiver 52 is reset in preparation for operation. Operation 312 ensures that no arbitrary pulses are output from DTMF transceiver 52.

Figure 3D:
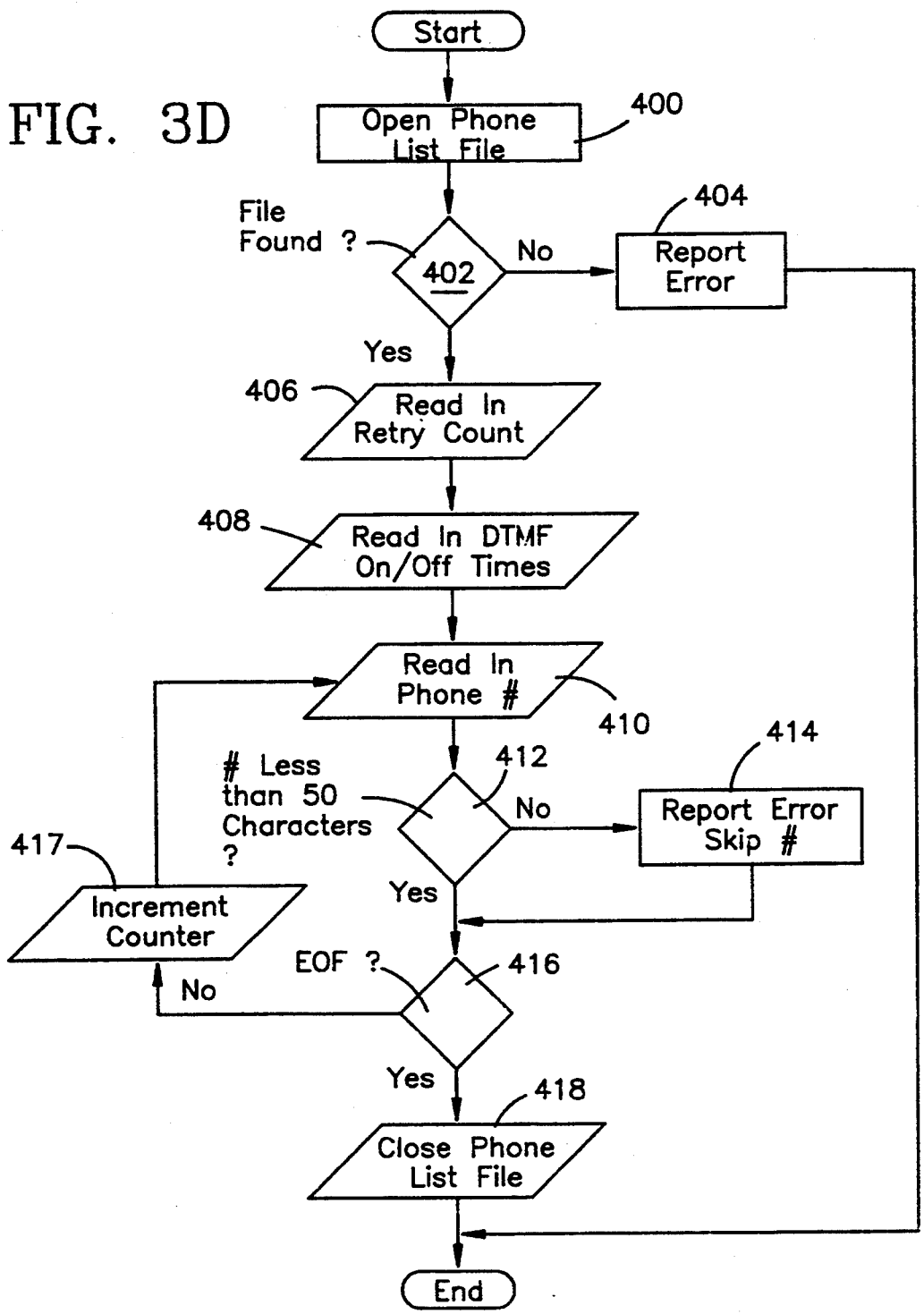
FIG. 3D is a detailed flow chart of block 3d of the FIG. 3 top level flow chart.

After the different component chips on system board 28 have been initialized, the program proceeds to step 3D to load in the phone number information, as shown in detail in FIG. 3D.

In operation 400, the phone list file, in this instance PHONE.DAT, is opened. Whether or not a phone list file is found is determined in operation 402. If there is no phone list file found, the program reports an error in operation 404 and quits. If there is indeed a phone list file, the first line of the phone list, in our example a five (5), is read in operation 406. In operation 408, the second and third lines, corresponding to respective on and off times of DTMF transceiver 52, are read. The phone number on the next line of the phone list file is then read in operation 410. If this telephone number contains more than 50 characters, per determination in operation 412, the line is skipped and an error is reported in operation 414. If the phone number indeed has less than 50 characters, the program then determines whether that phone number is the last in the phone list file in operation 416. If it is not, the program increments a counter in operation 417, returns to operation 410, and reads the next phone number from the next line in the phone list file. If it is the end of the file, the phone list file is closed in operation 418 and the program proceeds to step 80 (FIG. 3) by resetting the different time variables of the different components of system 28 to zero (0) so that a call may be initiated from system board 28 to the desired destination(s). The first destination is shown at line 4 of the example phone list file.

The program next proceeds to step 82, shown in FIG. 3, to put system board 28 into phone mode and off hook to begin interfacing with phone line 32 via telephone interface 30. At this time, a dial tone is detected by system 28, more specifically by call progress detector 54, from phone line 32.

Figure 3E:
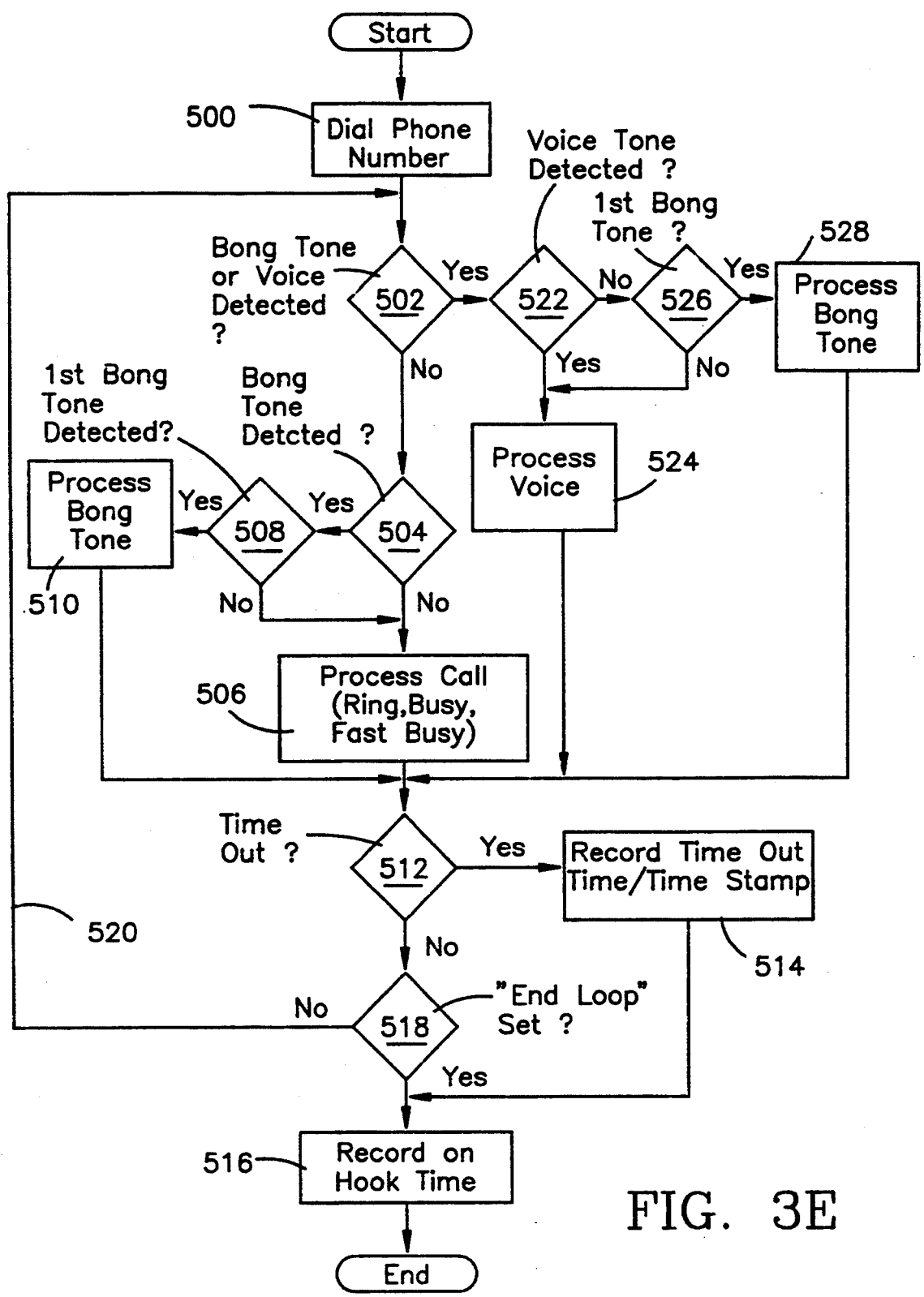
FIG. 3E is a detailed flow chart of block 3e of the FIG. 3 top level flow chart.
Figure 3F:
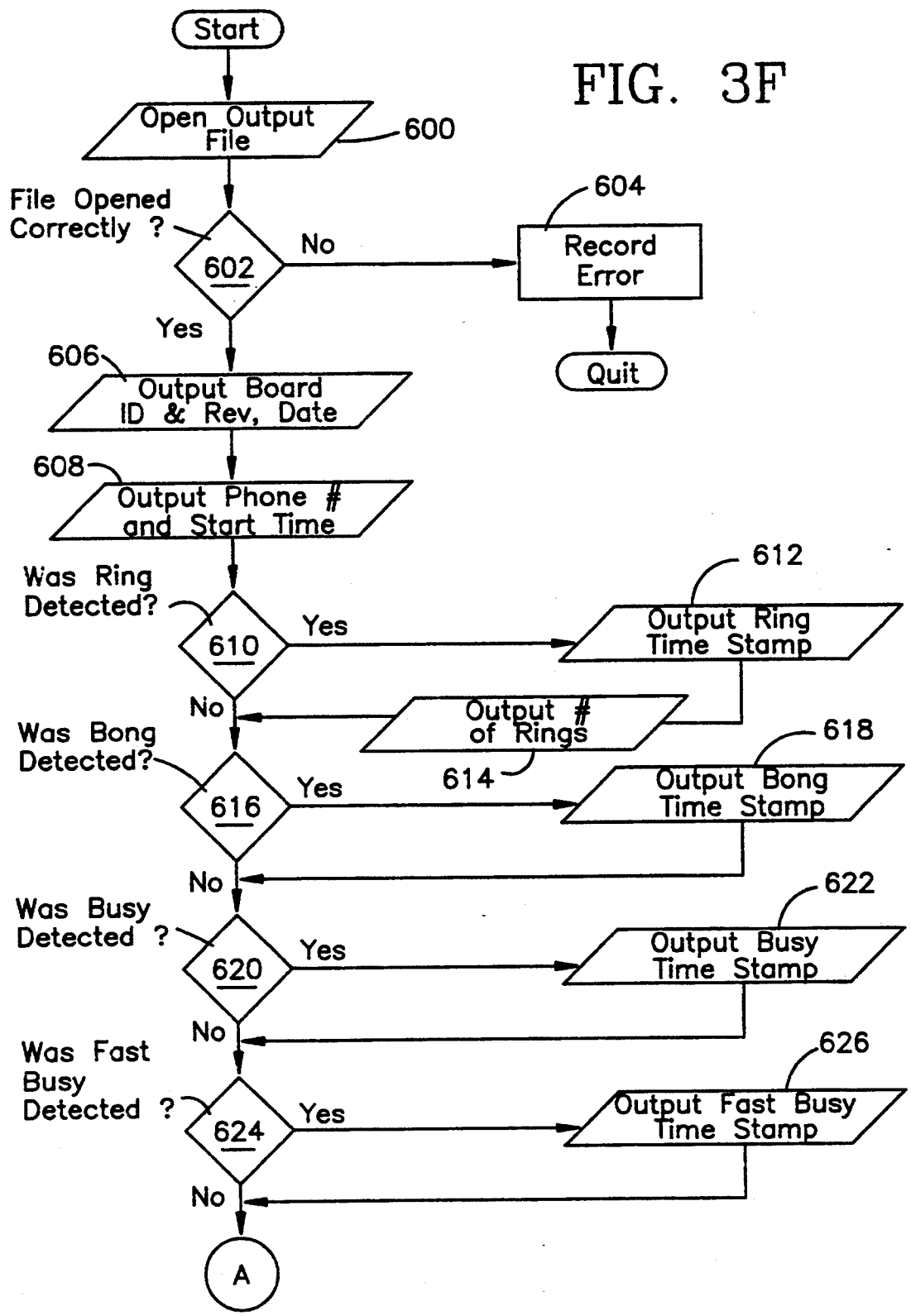
Figures 1, 3F:
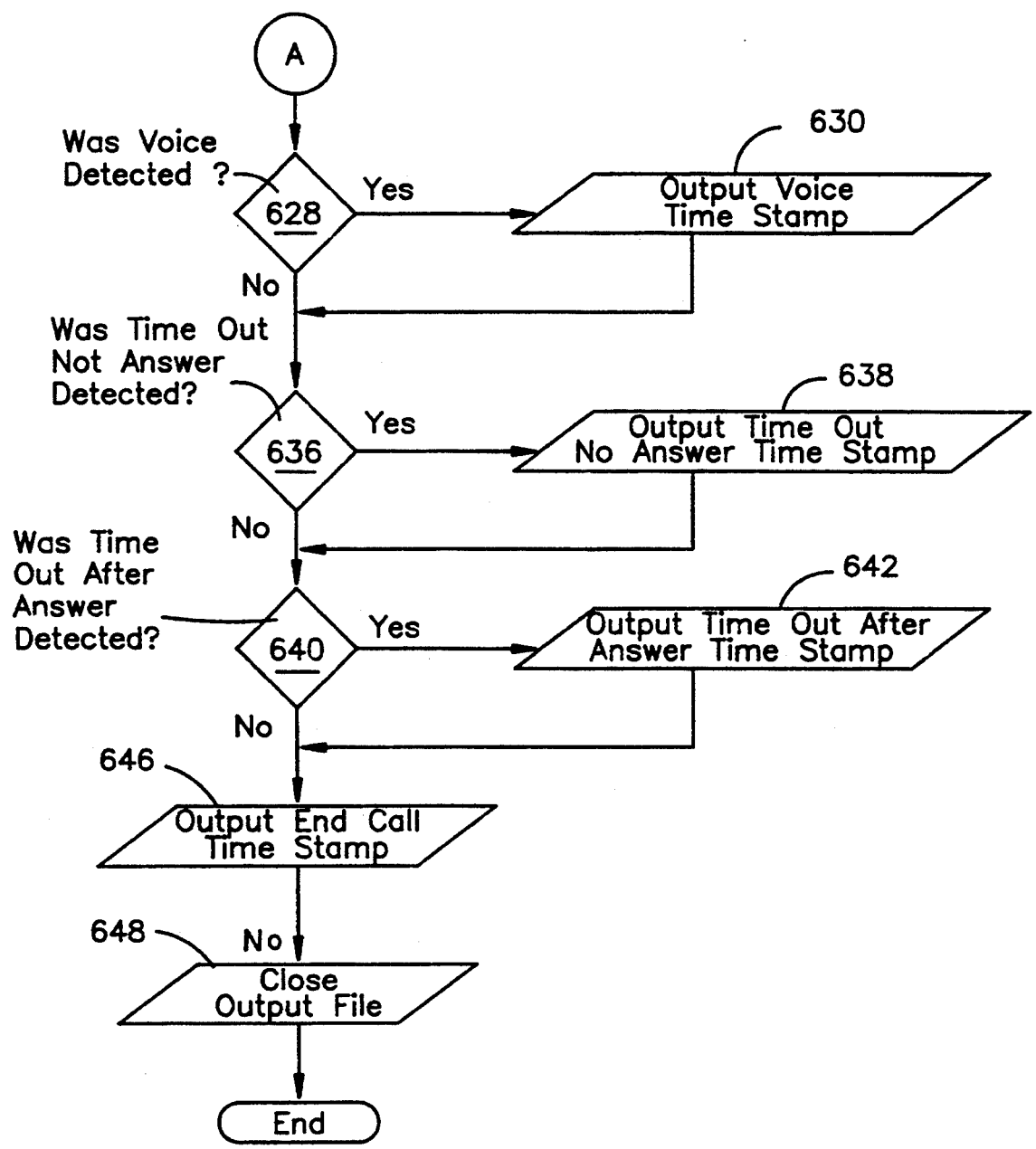

The program next proceeds to step 3E, shown in detail in FIG. 3E. The process call step of FIG. 3E begins by dialing the first phone number listed in the phone list file, as the first chosen destination, in operation 500. The audible tones for generating the call are produced by DTMF transceiver 52 and fed through line 72 to summing amplifier 60, isolation transformer 42, telephone interface 30, and phone line 32. The on and off times read from respective lines 2 and 3 of the phone list file are taken into consideration by DTMF transceiver 52 in producing the audible tones.

At this time, the program continuously scans the signals being fed back to the system from phone line 32 to determine if any of the possible tones such as ring back, busy, fast busy, bong or voice is received by the system. Whether a bong tone or a voice is detected is determined in operation 502. In operation 504, the program further queries whether a bong tone has been detected. If not, the program assumes that one of the remaining possible tones—such as ring back, busy or fast busy—is present and it orders call process detector 54 to process the respective tones by, for example, counting the number of rings and stamping the time at which the ring(s) or other tones were detected. The stamped times are recorded in operation 506.

If a bong tone is detected, the program proceeds to operation 508 to determine whether this is a first of the bong tones. If it is not, the program returns to operation 506. If it is, the first bong tone is processed in operation 510 by having the time at which the system first detects the bong tone time stamped and recorded. Thereafter, the program proceeds to operation 512 to determine whether this call has reached its time limit (time out). Time out only occurs if the phone is never answered and none of the call progress tones are detected. If time out has occurred for the routine, then the different measured parameters are recorded in operation 514 and the program proceeds to operation 516 to record the time the call is ended. After that, this routine ends and control is passed to step 3F in FIG. 3. On the other hand, if time out has not been reached, the program proceeds to operation 518 to determine whether "end loop" is set. "End loop" is set by any of the signal detect operations in this routine. After a valid signal is detected, "end loop" is set so that this routine ends. If yes, the program proceeds to operation 516 to record the time the call is completed (on hook). If not, by way of line 520, the program returns to operation 502 to once again monitor the signal being provided to the system from phone line 32 to determine if it is any of the possible signals including bong tone, voice, busy, fast busy, or ring back.

If a voice response is detected in operation 522, the moment at which the voice was first detected by voice detect circuit 56 is recorded in operation 524. The program then proceeds to operation 512, to again determine whether the program is to continue to run. If no voice is detected, the program then determines whether the input signal from phone line 32 is a first bong tone in operation 526. If it is not, given the fact that there can legally only be one bong tone, by process of elimination, voice must have been detected. At which case, the program proceeds to operation 524 to process the detected voice. If it is a first bong tone, the program proceeds to operation 528 to process the bong tone by recording the time when the bong tone was first discriminated by call progress detector 54. The time duration alter the bong tone and before the operator intercepts the call is also recorded. Thus, by processing the bong tone and the time taken by an operator to answer after the first bong tone, the program can provide the user of system board 28 the parameters necessary to determine the optimal number of operators required to answer credit card calls.

The reason that both bong tone and voice are to be detected together in operation 502 is due to the fact that bong tone falls within the frequency of voice detect circuit 56. Hence, the different branches in FIG. 3E are required to separate the voice from bong. In other words, by following the different branches in FIG. 3E, voice can be detected and processed by operations 522 and 524. Similarly, bong can be detected by operations 502, 504, 508 and 510 along one branch; and 502, 522, 526 and 528 along another branch.

It should be noted that it is at operation 524, i.e. process voice, that the program decides that there is a voice answer. And at the end of the voice answer, the program sends out through CODEC transceiver 50 the stored voice message to the desired destination. The operation illustrated in FIG. 3E continues through the main central loop as long as none of the valid network responses except ring back is detected. If any signal is detected which causes a side branch to be executed, end loop will be set in that branch which will end this loop. If time runs out, as determined in operation 5 12, the time out is recorded in operation 514 and the on hook time likewise is recorded in operation 516. After which the program proceeds to step 3F, shown in FIG. 3 and in detail in FIG. 3F.

The various data recorded in step 3E are stored by the operations of step 3F. To begin with, the output file OUTPUT.DAT is opened in operation 600. Whether or not the output file is opened correctly is determined in operation 602. If it is not, an error is recorded in operation 604 and the program quits. If it is, the information relating to the board such as its identification and revision number, as well as the date on which the test is taken are recorded at the first three lines of the output file in operation 606. In operation 608, the time at which call processing begins and the phone number(s) dialed are also recorded.

In operation 610, a determination is made on whether a ring has been detected. If it has, the time at which the ring began is recorded in operation 612. The number of rings received is likewise recorded in operation 614. Operation 616 determines whether a bong tone has been detected. If it has, the time at which the bong tone was detected is recorded in operation 618. The program then proceeds to operation 620 to determine whether a busy tone has been detected. If it has, the time at which the busy tone was detected is recorded in operation 622. The same procedure is followed in operation 624 to determine whether a fast busy tone has been detected. If it has, the information relating to when the fast busy tone was detected is recorded in operation 626.

In operation 628, the program determines whether there is a voice answer. It there is, the time at which it is detected is recorded in operation 630. Operation 636 determines whether there was any answer transmitted from the destination at all throughout the allotted evaluation time period. If there was no answer at all, (i.e. time out was detected in step 3D) this information likewise is recorded in operation 638.

There is always the possibility that a noisy phone line would be encountered which would render voice detect circuit 56 to wrongly construe that voice is present, when in fact it is not. In such instance, if there is no built-in predetermined time period (for example 45 seconds) to signal the end of any voice response the system would continue to monitor the noisy phone line indefinitely. Thus, as a safeguard, operation 640 determines whether an answer was received, but silence was not detected, after the voice answer. If the time limit is reached after voice detect, the time is recorded in operation 642. The end of the call time is recorded in operation 646. Thereafter, the program closes the output file in operation 648.

Having thus evaluated the first phone number in the phone number list, the program proceeds to the next phone number in step 84. If the end of file marker has not been reached, the program returns to step 80 via return path 86 to begin anew the operations discussed with respect to steps 80, 82, 3E and 3F. If the phone number just finished is in fact the last phone number in the phone list file, as determined in step 88, the program continues to step 90 whereby the first phone number on the list is retried. The number of retries for each phone number is, again, determined by line 1 of the phone list file. The program continues until, as determined by step 92, that it is the last retry. At which time the program quits.

An example of the output file, with its representation codes, is given below. As shown, each piece of information is contained on its own line within the output file. A unique one letter code, followed by a colon and a space, proceeds each line of information. Error codes are represented by one unique number followed by a colon, a space and the time the error occurred. As should be noticed, the example given shows that two telephone numbers 595-4266 and 595-4267 have been evaluated and the resulting parameters recorded.

| CODE | CODE REPRESENTATION | [TYPICAL FORMAT] |
|---|---|---|
| A: | PRINTED CIRCUIT BOARD I.D. NUMBER | [1] |
| B: | PRINTED CIRCUIT BOARD REVISION NUMBER | [0] |
| E: | DATE | [Wed Jan 31 1990] |
| F: | TIME AT START OF CALL PROCESSING | [18:29:30:690] |
| G: | PHONE NUMBER DIALED | [9,0-301-595-4266] |
| H: | TIME AT END OF DIALING | [18:29:30:690] |
| I: | TIME AT BEGINNING OF RING | [18:29:30:690] |
| J: | NUMBER OF RINGS (RING BACK) | [18:29:30:700] |
| K: | TIME AT BUSY DETECT | [18:29:30:700] |
| L: | TIME AT FAST BUSY DETECT | [18:29:30:700] |

-continued

| CODE | CODE REPRESENTATION | [TYPICAL FORMAT] |
|---|---|---|
| M: | TIME AT BONG DETECT | [18:29:30:700] |
| N: | TIME AT VOICE ANSWER | [18:29:30:700] |
| P: | TIME AT TIME OUT, NO ANSWER | [18:29:30:700] |
| S: | TIME AT AFTER ANSWER AND NO SILENCE | [18:29:30:700] |
| T: | TIME AT "ON HOOK", DONE | [18:29:30:700] |
| FATAL ERROR CODES: | | |
| 1: | BOARD NOT FOUND | [18:29:30:700] |
| 2: | PHONE LIST FILE NOT FOUND | [18:29:30:700] |
| 3: | NO ENTRIES IN PHONE LIST FILE | [18:29:30:700] |
| 4: | PHONE NUMBER EXCEEDS 50 CHARACTERS | [18:29:30:700] |
| 5: | CAN NOT OPEN OUTPUT FILE | [18:29:30:700] |
| 6: | CAN NOT OPEN VOICE DATE FILE | [18:29:30:700] |
| 7: | CAN NOT OPEN CONFIGURATION FILE | [18:29:30:700] |
| 8: | CAN NOT GET BASE ADDRESS FROM CONFIGURATION FILE | [18:29:30:700] |
| 9: | DIAL TONE NOT FOUND | [18:29:30:700] |

An example of an output file is:

```
A: 1
B: 0
E: Fri Feb 02 1990
G: 595-4266
H: 13:19:05:340
I: 13:19:09:070
J: 2
N: 13:19:16:540
T: 13:19::21:980
 .
 .
 .
A: 1
B: 0
E: Fri Feb 02 1990
G: 595-4267
H: 14:19:05:340
I: 14:19:09:070
J: 2
N: 14:19:16:540
T: 14:19:21:980
```

In brief, the first embodiment of the present invention operates as follows. First, the component chips on the system board, the system board address and the respective names of the configuration file, the phone list file and the output files are initialized. Next, a voice message is recorded, digitized and stored in memory 67 of processor 66 for transmission through CODEC transceiver 50. Thereafter the component chips such as DTMF transceiver 52, CODEC transceiver 50, call progress detector 54 and voice detect circuit 56 are initialized.. The phone number information is then loaded into the system by opening the phone list file. All of these operations are performed prior to the actual evaluation of the response time of the desired destination telephone number representative of, for example, a switch exchange.

To begin evaluation, the various time variables are reset to zero. The system board is set to a phone mode and connected to the phone line. Tones representative of the first read phone number are generated in DTMF transceiver 52 and fed, with proper amplification by summing amplifier 60, to phone line 32 and sent to the desired telephone number destination (telephone exchange). At the same time, call progress detector 54 begins to monitor the progress of the call. The first ring back received from the destination is noted, as are the number of rings received before a voice answer is detected by voice detect circuit 56. The time at which the voice answer was first detected is likewise recorded.

After the voice answer ends, CODEC transceiver 50 sends the previously stored voice message to the destination to verbally answer the person who answered. Do note that different types of voice messages may be sent.

After the voice message has been sent, the system disconnects from the first read telephone number and continues to the next telephone number, if any, in the phone list file. The process of ringing a given destination, waiting for the ring back, counting the number of ring backs, waiting for a voice answer and answering the voice answer with a voice message is repeated for each of the phone numbers listed in the phone list file.

In a case where a credit card switch exchange is called, the system discriminates, by means of DTMF transceiver 52, whether the received return tone is a bong, or other network response. If a bong tone is received, the system waits until an operator gets on line and gives a voice answer. At which time the voice message to the operator is sent.

After each phone number in the phone list file has been called, the various data relating to the different network responses are recorded. By manipulating the different recorded data, such as for instance the measured time from which a first ring back was received and the time thereafter until an operator answers, an accurate assessment of the optimal number of operators required at a given destination switch exchange can be ascertained. For example, if it has been determined that a caller typically hangs up if no operator answers after five (5) ring backs, more operators may be added to shorten the number of ring backs to four (4). Conversely, if it has been determined that for a particular destination switch exchange, an operator would answer after only one (1) ring back, a smaller number of operators is made available at that switch exchange. Thus, the optimal number of operators at a given time period can be ascertained for each evaluated switch exchange.

Figure 4:
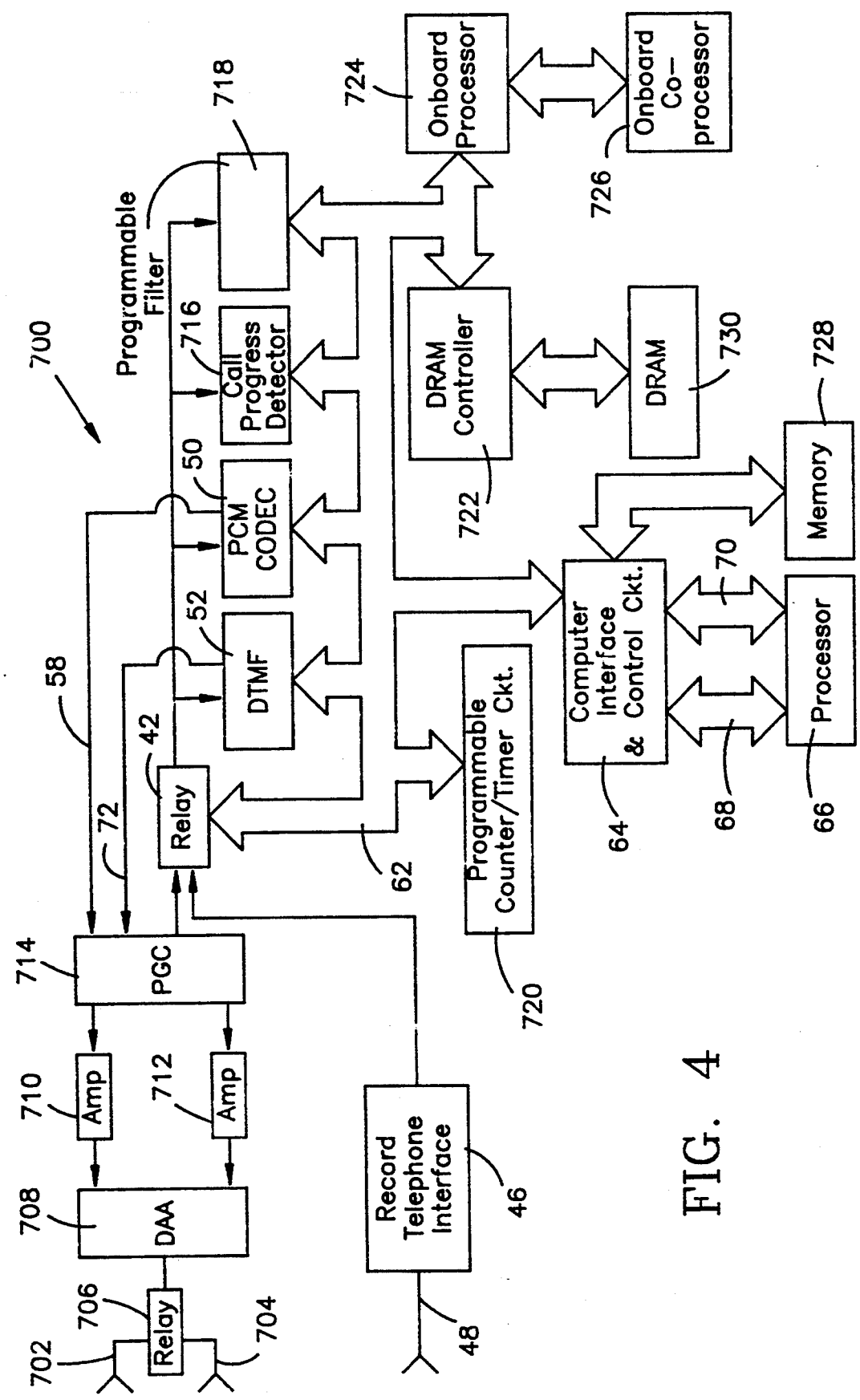
FIG. 4 is a block diagram of the hardware components of a second embodiment of the present invention.

A second embodiment of the present invention is discussed herein with reference to FIG. 4, whose components which are the same or function the same as those of FIG. 2 are labeled the same.

As shown, the second embodiment system board 700 has two telephone lines 702 and 704 each connected to a relay 706, which is connected to a data access arrangement (DAA) 708. With relay 706, lines 702 and 704 can be individually connected to DAA 708, thereby making it possible to connect two different lines to perform sequential tests on those lines. These two lines are useful during comparative testing when different types of phone lines need to be tested at remote locations.

DAA 708 is a semiconductor chip made by the Dallas Semiconductor Company with manufacturing number DS2249, DS2249EU, or DS2249PH. It encompasses telephone interface 30 and isolation transformers 34 and 36 discussed previously with respect to the FIG. 2 embodiment. Moreover, DAA 708 is fully compatible under FCC testing requirements. In essence, DAA 708 provides for correct interfacing between telephone lines 702, 704 and the other components of system board 700.

Connected to DAA 708 via buffer amplifiers 710 and 712 is a programmable gain circuit (PGC) 714. PGC 714 in essence is a variable voltage reduction circuit that comprises a chip made by the Analog Devices Company having manufacturing part number DAC8840. PGC 714 provides the proper input/output between DAA 708 and the rest of system board 700. An output of PGC 714 is provided to relay 42 whose function is the same as that discussed previously. Provided as inputs to PGC 714 are an output line 72 from DTMF 52 and an output line 58 from PCM CODEC transceiver 50. The respective functions of DTMF 52 and CODEC transceiver 50 are as described previously. However, it should be noted that CODEC transceiver 50, for the second embodiment, may be a semiconductor chip made by the National Semiconductor Company having manufacturing part number TP3058. As shown, DTMF 52 and CODEC transceiver 50 each have an input provided by relay 42.

Also having as an input from relay 42 is call progress detector 716 whose function is similar to that of call progress detector 54 disclosed in the FIG. 2 embodiment. In addition, call progress detector 716 has a low pass filter, to be used with the filters in programmable filter 718, which also has an input provided by relay 42.

Programmable filter 718, as its name implies, has a number of programmable band pass filters for the FIG. 4 embodiment. In particular, there are two fixed wide band filters which complement the low band pass filter in call progress detector 716. There are furthermore two narrow band filters whose center frequencies a user can adjust to isolate any tone. The wide band filters, including that in call progress detector 716, for the instant embodiment, may have respective center frequencies of 300 to 600 Hz, 700 to 1500 Hz, and 1500 to 3300 Hz. Albeit the filters in programmable filter 718 may be individually configured, for the FIG. 4 embodiment, a semiconductor chip made by the Maxim Company having manufacturing part number MAX260 is used.

Relay 42, DTMF 52, CODEC transceiver 50, call progress detector 716 and programmable filter 718 are all connected to bidirectional bus 62. Further connected to bus 62 is a programmable counter/timer circuit 720, a computer interface and control circuit 64 whose function is the same as was described previously, a Dram controller 722 and an on-board processor 724. Computer interface and control circuit 64 has connected thereto by means of bidirectional buses 68 and 70 processor 66, which may be a microcomputer, as discussed previously. Further connected to interface and control circuit 64 is a memory 728, which may be a conventional hard disk or some other storage medium. Connected to conventional Dram memory controller 722 is a Dram memory 730, which for the instant embodiment comprises at least 2 Mbytes. Dram 730 may be a National Semiconductor DP8421 chip. On-board processor 724, which is an Intel 80186 chip, has connected thereto a co-processor 726, manufactured by the Intel Company having manufacturing number 80187.

Programmable counter/timer circuit 720 is a semiconductor chip manufactured by the Intel Company having manufacturing number 8254. The purpose of counter/timer circuit 720 is to provide a number of frequencies for the operation of the components of system board 700 based on the frequency of a timing crystal (not shown). The different base times provided by counter/timer circuit 720 provide for synchronized operation of the different components of system board 700.

On-board processor 724 and co-processor 726 provide system board 700 the capability of not requiring external processing, by for example processor 66, to perform any of the functions of system board 700. To achieve this end, the instructions required to perform the different operations are loaded into Dram 730, as for example from memory 728. Dram controller 722 controls the operation requests of the different components of system board 700 on bus 62. Processor 724, in the meantime, performs the same function as was done previously by remote processor 66.

Although not shown in FIG. 4, for system board 700, there is connected to DAA 708 a monitor speaker that enables a user to audibly monitor the progress of a call placed to a destination.

In brief, the evaluation unit as exemplified by the second embodiment system board 700 of the present invention provides for automated testing of call processing as well as operator response times. In addition to the advantages disclosed with regard to the first embodiment, the second embodiment of the present invention allows a user to define the sequence of logical steps in which to complete a call, by means of a command line user interface. Moreover, the second embodiment of the present invention is capable of detecting and identifying virtually any type of telephone exchange response signals including, for example, ring back, busy, reorder, dial tone, bong tone, cut-through, V-NET tone, and voice. It further allows a real time interaction between system board 700 and the destination, as for example when a voice is detected, by both recording the voice from the destination and playing back voice messages in response. Furthermore, the characteristics of the telephone network can be evaluated, as for example by automatically performing echo testing, signal level measurements, speech distortion measurements, etc.

The operation of the system board evaluation unit of the FIG. 4 embodiment, also can be referred to as a telephone quality measure system (TQMS), is controlled by a primary operation program and a companion schedule program to enable remote unattended operation, scheduled file execution, and uploading and downloading of data and configuration files for the TQMS.

The TQMS performs the following functions, some of which were also performed by the first embodiment system board of the present invention. (1) Initialize chip addresses and file names; (2) initialize control latches and verify board presence; (3) initialize voice data array; (4) load signal description; (5) load command string; (6) initialize output buffer; (7) initialize output record; (8) process call; (9) write output record to disk; (10) go to next phone number and repeat steps 7-9; and (11) go to first phone number and repeat steps 70-10 for "recycle" times. Each of the above steps is divided into tasks that are performed by to be described subroutines.

There are five input files used with the operation program. They are: (1) configuration file CONFIG.-DAT; (2) phone list file PHONE.DAT; (3) signal description file DETECT.DAT; (4) command interpreter file COMMAND.DAT; and (5) voice record file VOICE.DAT. Three output files used with the operation program are: (1) output file OUTPUT.DAT; (2) error file ERROR.DAT; and (3) debug file TESTFILE.-DAT.

An example CONFIG.DAT file is as follows:

| Sample Value | Parameter |
| --- | --- |
| OX100 | First Base Address |
| OX180 | Second Base Address |
| 90 | Time-Out Period (Seconds) |
| PHONE.DAT | Standard Phonelist Input Filename |
| OUTPUT.DAT | Standard Output Filename |

As shown, the first and second lines of the CONFIG.-DAT file reference the addresses of system board 700 in hexadecimal format. The third line of the sample CONFIG.DAT file represents the time out period in seconds. For the example shown, this means that calls can last 90 seconds before a time out. The fourth line of the sample CONFIG.DAT file names the file name of the phone list file PHONE.DAT. The last line of the sample CONFIG. DAT file refers to the file name of the output file OUTPUT.DAT.

An example phone list input file PHONE.DAT is shown hereinbelow:

```
5
0.1
0.1
9,,1-301-595-4266
595-4266
5954266
1-800-555-56781/1-301-595-4266/301-595-4266-0000
1-800-877-8000#
0-301-595-4266/301-595-4266-000
```

Such phone list file ordinarily includes: (1) the phone numbers to be called; (2) the number of repetitions the phone list is to be called; and (3) the DTMF dialing speed.

As shown, the first line of the sample PHONE.DAT file contains an integer number that represents the number of times the phone list is to be cycled through. For example, the sample file indicates that the sample phone list is to be cycled through five times. The second line of the PHONE.DAT file represents the on-time duration (in tenths of second) for each DTMF pulse to be dialed. Thus, sample PHONE.DAT file shows that the DTMF tones are to last for 1/10 of a second. The third line of the PHONE.DAT file represents the off-time between DTMF pulses in seconds. Thus, for the illustrated PHONE.DAT file, the off-time is approximately 0.1 second. Each of the remaining lines of the sample PHONE.DAT file contains one phone number, which may be up to 50 digits long and contain any combination of digits 0-9, as well as letters A-Z, commas, asterisks (*), pound signs (#) and slash marks (/). By way of explanation, the slash mark is used for credit card numbers, VNET access codes and other dialing sequences that require multiple dialings.

An example of a DETECT.DAT file is shown hereinbelow. Each block of the DETECT.DAT file in essence represents a description (or signature) of a signal detectable by system board 700.

| | |
| --- | --- |
| NAME=DIAL TONE | NAME=BONG |
| CATEGORY=SPECIAL | CATEGORY=SPECIAL |
| CODE=W | CODE=M |
| DETECT TYPE=CONTINUOUS | DETECT TYPE=DISCRETE |
| PROCESS TYPE=COMMAND | PROCESS TYPE=COMMAND |
| LOW BAND ONLY LENGTH=3500 | LOW BAND ONLY LENGTH=600 |
| MIDDLE BAND ONLY LENGTH=0 | MIDDLE BAND ONLY LENGTH=0 |
| HIGH BAND ONLY LENGTH=0 | HIGH BAND ONLY LENGTH=0 |
| LOW/MIDDLE BANDS LENGTH=0 | LOW/MIDDLE BANDS LENGTH=0 |
| MIDDLE HIGH BANDS LENGTH=0 | MIDDLE/HIGH BANDS LENGTH=0 |
| LOW/HIGH BANDS LENGTH=0 | LOW/HIGH BANDS LENGTH=0 |
| ALL BANDS LENGTH=0 | ALL BANDS LENGTH=30 |
| NUMBER OF STATE CHANGES=1 | NUMBER OF STATE CHANGES=4 |
| BANDPASS FILTER 1 | BANDPASS FILTER 1 |
| FREQUENCY=0 | FREQUENCY=0 |
| BANDPASS FILTER 1 LENGTH=0 | BANDPASS FILTER 1 LENGTH=0 |
| BANDPASS FILTER 2 | BANDPASS FILTER 2 |
| FREQUENCY=0 | FREQUENCY=0 |
| BANDPASS FILTER 2 LENGTH=0 | BANDPASS FILTER 2 LENGTH=0 |
| NAME=VOICE | NAME=RING |
| CATEGORY=DEFAULT | CATEGORY=DEFAULT |
| CODE=N | CODE=1 |
| DETECT TYPE=VOICE | DETECT TYPE=COMMAND |
| PROCESS TYPE=COMMAND | PROCESS TYPE=RING |
| LOW BAND ONLY LENGTH=400 | LOW BAND ONLY LENGTH=1200 |
| MIDDLE BAND ONLY LENGTH=400 | MIDDLE BAND ONLY LENGTH=0 |
| HIGH BAND ONLY LENGTH=400 | HIGH BAND ONLY LENGTH=0 |
| LOW/MIDDLE BANDS LENGTH=400 | LOW/MIDDLE BANDS LENGTH=0 |
| MIDDLE/HIGH BANDS | MIDDLE/HIGH BANDS LENGTH=0 |

-continued

```
LENGTH=400                          LOW/HIGH BANDS LENGTH=0
LOW/HIGH BANDS LENGTH=400           ALL BANDS LENGTH=0
ALL BANDS LENGTH=400                NUMBER OF STATE CHANGES=2
NUMBER OF STATE CHANGES=10          BANDPASS FILTER 1
BANDPASS FILTER 1                   FREQUENCY=0
FREQUENCY=0                         BANDPASS FILTER 1 LENGTH=0
BANDPASS FILTER LENGTH=0            BANDPASS FILTER 2
BANDPASS FILTER 2                   FREQUENCY=0
FREQUENCY=0                         BANDPASS FILTER 2 LENGTH=0
BANDPASS FILTER 2 LENGTH=0
NAME=VNET                           NAME=BUSY
CATEGORY=SPECIAL                    CATEGORY=DEFUALT
CODE=R                              CODE=K
DETECT TYPE=CONTINUOUS              DETECT TYPE=REPEATING
PROCESS TYPE=COMMAND                PROCESS TYPE=REPEATING
LOW BAND ONLY LENGTH=3500           LOW BAND ONLY LENGTH=500
MIDDLE BAND ONLY LENGTH=0           MIDDLE BAND ONLY LENGTH=0
HIGH BAND ONLY LENGTH=0             HIGH BAND ONLY LENGTH=0
LOW/MIDDLE BANDS LENGTH=0           LOW/MIDDLE BANDS LENGTH=0
MIDDLE/HIGH BANDS LENGTH=0          MIDDLE/HIGH BANDS LENGTH=0
LOW/HIGH BANDS LENGTH=0             LOW/HIGH BANDS LENGTH=0
ALL BANDS LENGTH=0                  ALL BANDS LENGTH=0
NUMBER OF STATE CHANGES=1           NUMBER OF STATE CHANGES=2
BANDPASS FILTER 1                   BANDPASS FILTER 1
FREQUENCY=0                         FREQUENCY=0
BANDPASS FILTER LENGTH=0            BANDPASS FILTER LENGTH=0
BANDPASS FILTER 2                   BANDPASS FILTER 2
FREQUENCY=0                         FREQUENCY=0
BANDPASS FILTER 2 LENGTH=0          BANDPASS FILTER 2 LENGTH=0
NAME=REORDER                        NAME=CUT-THROUGH
CATEGORY=DEFAULT                    CATEGORY=DEFAULT
CODE=L                              CODE=C
DETECT TYPE=REPEATING               DETECT TYPE=DISCRETE
PROCESS TYPE=TERMINAL               PROCESS TYPE=IGNORE
LOW BAND ONLY LENGTH=0              LOW BAND ONLY LENGTH=0
MIDDLE BAND ONLY LENGTH=0           MIDDLE BAND ONLY LENGTH=0
HIGH BAND ONLY LENGTH=0             HIGH BAND ONLY LENGTH=0
LOW/MIDDLE BANDS LENGTH=0           LOW/MIDDLE BANDS LENGTH=0
MIDDLE/HIGH BANDS LENGTH=0          MIDDLE/HIGH BANDS LENGTH=0
LOW/HIGH BANDS LENGTH=0             LOW/HIGH BANDS LENGTH=0
ALL BANDS LENGTH=0                  ALL BANDS LENGTH=0
NUMBER OF STATE CHANGES=2           NUMBER OF STATE CHANGES=2
BANDPASS FILTER 1                   BANDPASS FILTER 1
FREQUENCY=0                         FREQUENCY=0
BANDPASS FILTER LENGTH=0            BANDPASS FILTER LENGTH=0
BANDPASS FILTER 2                   BANDPASS FILTER 2
FREQUENCY=0                         FREQUENCY=0
BANDPASS FILTER 2 LENGTH=0          BANDPASS FILTER 2 LENGTH=0
NAME=TPT-ANSWER                     NAME=DTMF
CATEGORY=SPECIAL                    CATEGORY=SPECIAL
CODE=Z                              CODE=AC
DETECT TYPE=DISCRETE                DETECT TYPE=DISCRETE
PROCESS TYPE=COMMAND                PROCESS TYPE=COMMAND
LOW BAND ONLY LENGTH=0              LOW BAND ONLY LENGTH=0
MIDDLE BAND ONLY LENGTH=0           MIDDLE BAND ONLY LENGTH=0
HIGH BAND ONLY LENGTH=900           HIGH BAND ONLY LENGTH=0
LOW/MIDDLE BANDS LENGTH=0           LOW/MIDDLE BANDS LENGTH=0
MIDDLE/HIGH BANDS LENGTH=80         MIDDLE/HIGH BANDS
LOW/HIGH BANDS LENGTH=0             LENGTH=500
ALL BANDS LENGTH=0                  LOW/HIGH BANDS LENGTH=0
NUMBER OF STATE CHANGES=3           ALL BANDS LENGTH=0
BANDPASS FILTER 1                   NUMBER OF STATE CHANGES=2
FREQUENCY=0                         BANDPASS FILTER 1
BANDPASS FILTER LENGTH=0            FREQUENCY=0
BANDPASS FILTER 2                   BANDPASS FILTER LENGTH=0
FREQUENCY=0                         BANDPASS FILTER 2
BANDPASS FILTER 2 LENGTH=0          FREQUENCY=0
                                    BANDPASS FILTER 2 LENGTH=0
NAME=LONG-TONE
CATEGORY=SPECIAL
CODE=AZ
DETECT TYPE=DISCRETE
PROCESS TYPE=COMMAND
LOW BAND ONLY LENGTH=0
NUDDLE BAND ONLY LENGTH=0
HIGH BAND ONLY LENGTH=2500
LOW/MIDDLE BANDS LENGTH=0
MIDDLE/HIGH BANDS LENGTH=0
LOW/HIGH BANDS LENGTH=0
ALL BANDS LENGTH=0
NUMBER OF STATE CHANGES=2
BANDPASS FILTER 1 FREQUENCY=0
```

-continued

```
BANDPASS FILTER LENGTH=0
BANDPASS FILTER 2 FREQUENCY=0
BANDPASS FILTER 2 LENGTH=0
```

As shown, each of the DETECT.DAT blocks may be identified by its first line as to the type of signal it describes. For example, the first DETECT.DAT block provides a dial tone signature. The second line of each of the DETECT.DAT blocks illustrates the type of enable category the signal belongs to. For example, dial tone and bong tone belong to the special category, while voice and ring the default category. A default category signifies that the signal will be detected at any time, while a special category signifies that, for the system to detect such tone, it has to be specifically listed in the command string (which is to be discussed later). The designating of a signal being special, as compared to default, limits the number of signals that can be compared at any given time. In other words, the more signals enabled special, the longer it takes for the system to detect the signals coming in, as the system has to compare each of the incoming special signal with a plurality of predetermined signal signatures.

The third line of the DETECT.DAT signature block is a single letter that codes that signal description. For example, W represents a dial tone, while M represents a bong tone.

The type of detection to be performed is given in line 4 of each of the DETECT.DAT signature blocks. The detection type specifies the peculiar signature a signal will have to help expedite discrimination of one signal from another. A CONTINUOUS signal, such as dial tone, will not end with the maximum sample duration. Examples of such CONTINUOUS detector types are dial tone and VNET. To end those signals, the user has to press a digit, as for example the "#". A DISCRETE signal, such as a bong tone, will only happen once, and the sampled portion must be used to discriminate it from others. Upon detecting such signals, the system reverts to the aforementioned command string. Albeit it is considered to be a discrete signal, "ring" is processed differently, as the system requires to keep a tab on the number of times the ring signal has occurred. A REPEATING signal, such as busy, must be detected by sampling multiple, identical discrete signal pulses. A SILENCE detection type represents a lack of a signal response. A VOICE detection type is based upon the multiple frequencies and amplitudes in voice which will cause multiple transitions (or state changes) in the sampled signal.

There are, however, a couple of special cases such as "reorder" and "busy" which fall into the repeated detection type, to which the system reacts by hanging up, so long as the detected busy or reorder signal has occurred for a prescribed period of time.

The next line in each of the DETECT.DAT signature blocks is representative of the type of process that is performed after the signal has been detected. The process type tells the command line interpreter what to do once a signal has been discriminated. For example, the busy signal is a repeating signal that is detected by looking for a repeating signature but must be processed as a terminal signal because once a busy is detected, the call is deemed to have ended. COMMAND is the type which instructs the interpreter to proceed to the next consecutive instruction. TERMINAL causes the call to end immediately, regardless of what the command string contains. The process type IGNORE instructs the interpreter to do nothing except look for another signal. RING is processed like a discrete signal except the output file (buffer) only contains a time stamp of the first occurrence of ring and the number of ringbacks. All other process types have a time stamp in the output file for each occurrence.

The next seven lines in each of the DETECT.DAT signature blocks identifies the amount of energy provided by that signal at a particular frequency range. For example, for dial tone, there are 3.5 seconds of low band energy; while for bong, there is 0.6 second of energy in the low band and some energy in the other bands. The number of state changes for each of the signals is given on the next line of the respective DETECT.DAT signature blocks. For example, a ring tone has two state changes, while a bong tone has 4. In contrast, a dial tone only has one state. Contrast that with voice which has a multiple number of changes.

An example signal signature is given by the "TPT-Answer" DETECT.DAT signature block, which is the signal description of an automatic responder. As shown, the signature of the TPT-Answer signal is given by its having 0 low band, 0 middle band, 0.9 second high band, 0 low/middle band, 0.08 second middle/high band, 0 low/high band, and 0 all bands. The number of state changes for the TPT-Answer signal is 3.

With respect to the DETECT.DAT signature blocks, do note that the seven energy lines, or fields, for each of the files represent cadences, which are values representative of the lengths of the syllables that are expected to be detected by the band pass filters of programmable filter 718, individually or in various combinations at the same time. The values of the cadences are in milliseconds.

The fourth of the input files used by the primary operation program is the COMMAND.DAT file, which in essence is a command string that mandates a specific sequence of actions and signal detections to be customized to perform specific tests. This file is translated by a command interpreter within the software to direct its operation. In other words, the COMMAND.DAT file comprises a string of commands that direct the flow of actions to be executed and the possible signal detections resulting from those actions.

There are five execution commands: (1) on-hook; (2) off-hook; (3) play; (4) pause; and (5) dial.

On-hook and off-hook are self explanatory. Play causes the voice message recorded in the VOICE.DAT file (to be discussed later), to be played. Pause causes a delay before the execution of the next command. The length of the delay is included as an argument and is specified in tenths of a second. For example, a pause 8 means there is a 0.8 second delay. Dial of course is the next string of digits to be out pulsed.

Sample command strings are shown below.

| Dial to Responder (Tone response) | Dial to Voice (Human Operator) | Dial to Voice After Bong (Credit Card) | Dial to Voice After VNET (VNET access) |
|---|---|---|---|
| OFF-HOOK | OFF-HOOK | OFF-HOOK | OFF-HOOK |

| Dial to Responder (Tone response) | Dial to Voice (Human Operator) | Dial to Voice After Bong (Credit Card) | Dial to Voice After VNET (VNET access) |
|---|---|---|---|
| DIALTONE | DIALTONE | DIALTONE | DIALTONE |
| DIAL | DIAL | DIAL | DIAL |
| MODEM | VOICE | BONG | VNET1 |
| ON-HOOK | PAUSE 8 | DIAL | DIAL |
|  | PLAY | VOICE | VNET2 |
|  | ON-HOOK | PAUSE 8 | DIAL |
|  |  | PLAY | VOICE |
|  |  | ON-HOOK | PAUSE 8 |
|  |  |  | PLAY |
|  |  |  | ON-HOOK |

With reference to the simplest of the example command strings, i.e., the dial to responder, the following sequence of events occurs: (1) the system goes off-hook; (2) a phone number is dialed after the dial tone is detected; (3) the system waits for a modem signal; and (4) the system goes on-hook upon receiving the modem signal. Do note that if any signal is detected during the example calling strings that is from the category defined as default, that signal is detected, recognized and time stamped. Signals that are neither default nor declared in the command line are detected, time stamped, and labeled as unknown.

The last input file used by the primary operation program is the VOICE.DAT file. This file is a compressed binary file which contains recorded voice messages, and is similar to that discussed previously with respect to the FIG. 2 embodiment.

In operation, the evaluation unit of the FIG. 4 embodiment reads in all of the signal descriptions, and stores them in the memory, as for example Dram 730 (FIG. 4). The system then reads and stores the given command strings. After which the PHONE.DAT file is read and the information contained therein stored. The system next proceeds to dial each of the phone numbers listed in the PHONE.DAT file, while at the same time performing operations according to the store command strings for processing the calls. As the system is processing the calls, data representative of the characteristics of the network are collected and provided to an OUTPUT.DAT file, one of the output files utilized by the operation program.

Specifically, the OUTPUT.DAT file is used to store records as lines within the file, as illustrated by the sample below identified by output codes.

| CODE | REPRESENTATION | TYPICAL FORMAT |
|---|---|---|
| A: | PRINTED CIRCUIT BOARD I.D. NUMBER | [1] |
| B: | PRINTED CIRCUIT BOARD REVISION NUMBER | [0] |
| E: | DATE | [Wed Jan 31 1990] |
| F: | TIME AT START OF CALL PROCESSING | [18:29:30:690] |
| G: | PHONE NUMBER DIALED | [9.0-301-595-4266] |
| H: | TIME AT END OF DIALING | [18:29:30:690] |
| S: | TIME AT TIME OUT AFTER ANSWER | [19:29:30:700] |
| T: | TIME ON-HOOK | [18:29:30:700] |

An example OUTPUT.DAT file including the results from two test calls is shown hereinbelow.

| | |
|---|---|
| A: 4, | A: 4, |
| B: 1, | B: 1, |
| E: Fri May 10, 1990 | E: Fri May 10, 1990 |
| F: 13:19:08:400, | F: 14:19:05:270, |
| G: 595-4266, | G: 595-4266, |
| H1: 13:19:08:560, | H1: 14:19:05:340, |
| AA1: 13:19:09:070, | AA1: 14:19:09:070, |
| T: 13:19:21:980, | S: 14:19:16:540, |
|  | T: 14:19:21:980, |

With reference to the first test call, and using the codes set forth above, it can be ascertained that the test call was made from circuit board number 4 on May 10, 1990, starting at 1:19 p.m. and dialed to a number 595-4266. The time at the end of the dial, designated by H1, is important inasmuch as it is used for the post-dialed delay (PDD) measurements to determine the time for the dialing of the next signal. "AA" is representative of time that the next signal occurred while "T" is the time at which the call went on-hook (end of call).

The above discussed example is a basic testing call to find the response and then hang-up. With the FIG. 4 embodiment, the same station can be tested several times on any given day.

A second output file is the ERROR.DAT file, which is, as its name implies, an error file created to report an error if the output file cannot be created or opened.

The last of the output files is the debug file TEST-FILE.DAT, which is strictly used for debugging purposes and is useful when describing and modifying new signals.

The companion program that operates in conjunction with the primary operation program is a so-called schedule program that enables remote, unattended operation, scheduled file execution, and uploading and downloading of data and configuration files. Two input data files are used by the schedule program. They are SCHEDUL.DAT and COM-STRT.STS. In addition, a commercial remote communication program such as PC Anywhere version 5 is used. The COM-STRT.STS is a batch file that enables the booting up of the remote communication program.

SCHEDUL.DAT is the primary input file for the schedule program from which information are read and executed based on the (1) time to execute a given program, (2) the time duration of the operation, and (3) the name of the program to be executed. A sample entry is as follows:

11:34:00 1200 FOO.EXE

The above example entry would attempt to execute the file FOO.EXE at 11:34 a.m. However, if another program is running at the scheduled start time, the schedule program would wait until the being executed program is finished, at which time the FOO.EXE program will be executed, provided that the finished time is within the 1200 seconds window from the starting time of 11:34 (i.e., before 11:54 a.m.).

In sum, therefore, the purpose of the companion schedule program to the main operation program is to make sure that there is always a remote communication program running to schedule events, such as for example calls to be made to given destinations, and to enable the unattended operation of the TQMS.

Figure 5:
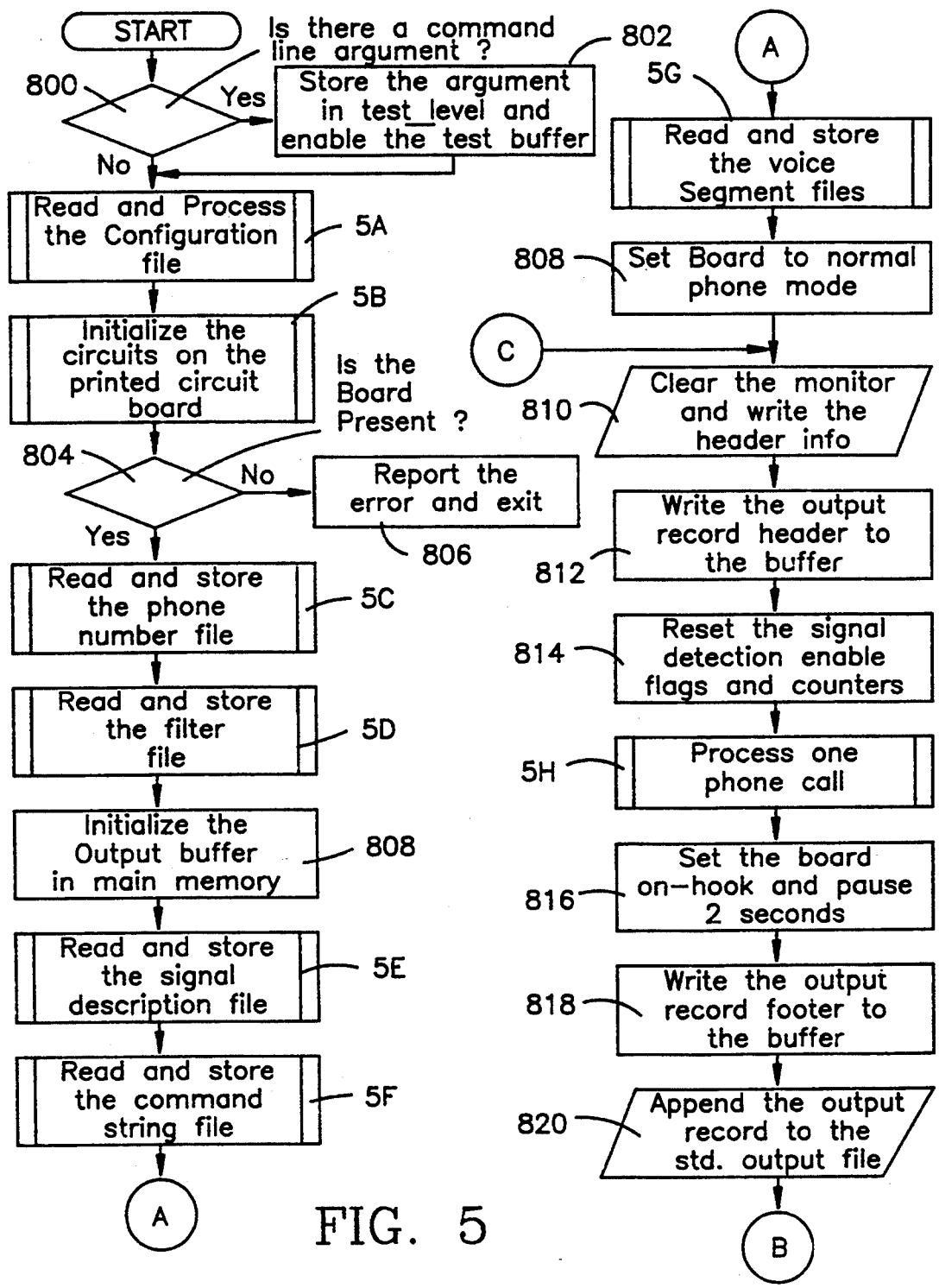
Figures 1, 5:
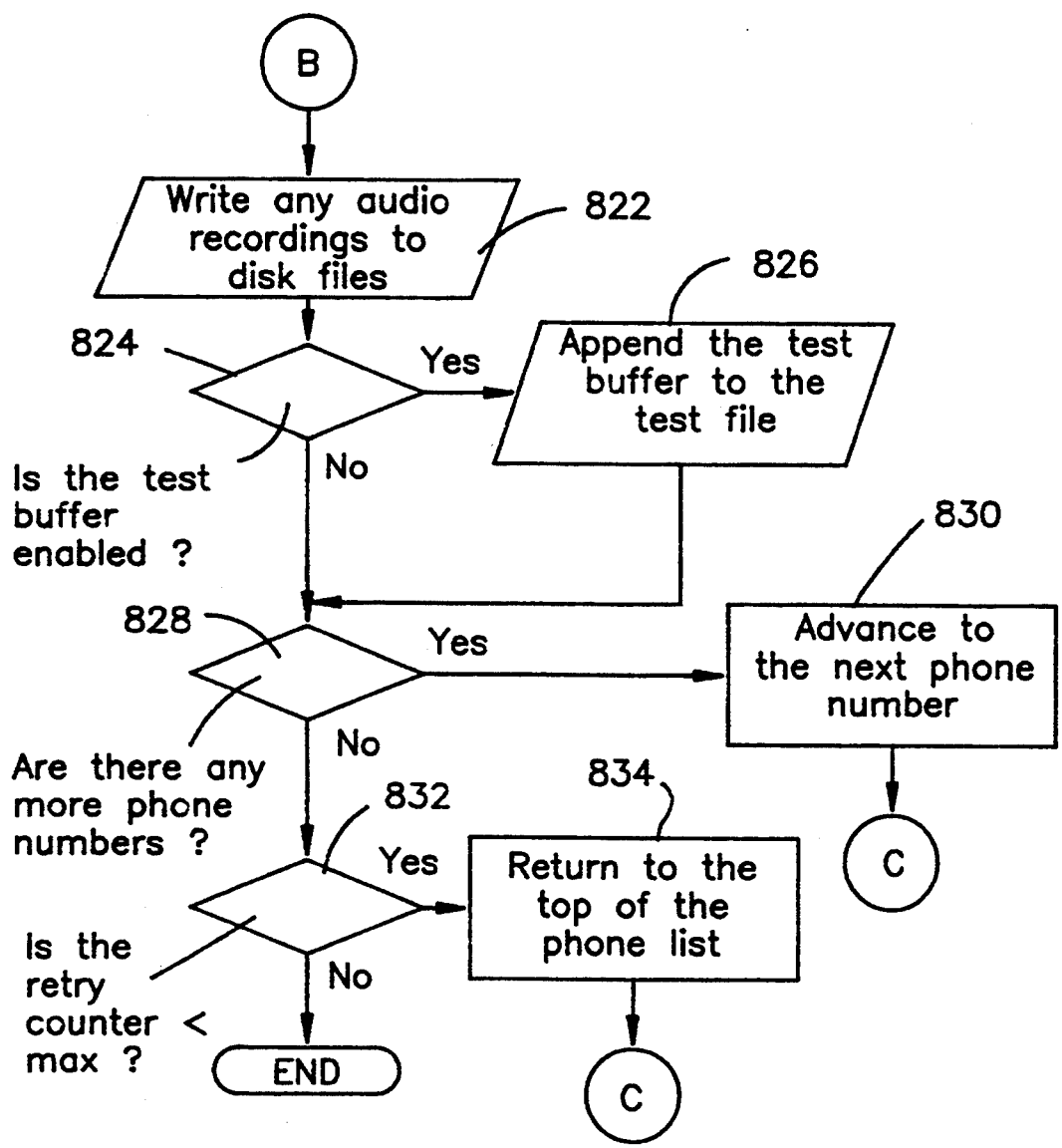

A top level flow chart illustrating the operation of the main operation program is shown in FIG. 5. Flow charts representing different subroutines of the main operation program of FIG. 5 are shown in FIGS. 5A to 5HB.

With reference to FIG. 5, the operation of the FIG. 4 embodiment of the present invention is as follows. The system begins by querying whether there is a command line argument at decision block 800. The purpose of this query is to determine whether a particular option is required to perform a specific function at the beginning of the program. For example, if the program turns on a switch a, it may mean that a diskette in drive a of the TQMS has to be read first. And if there is in fact an argument at the command line, then this argument is stored in a certain test level to enable the test buffer per block 802. If not, the system proceeds to block 5a to read and process the configuration file.

Figure 5A:
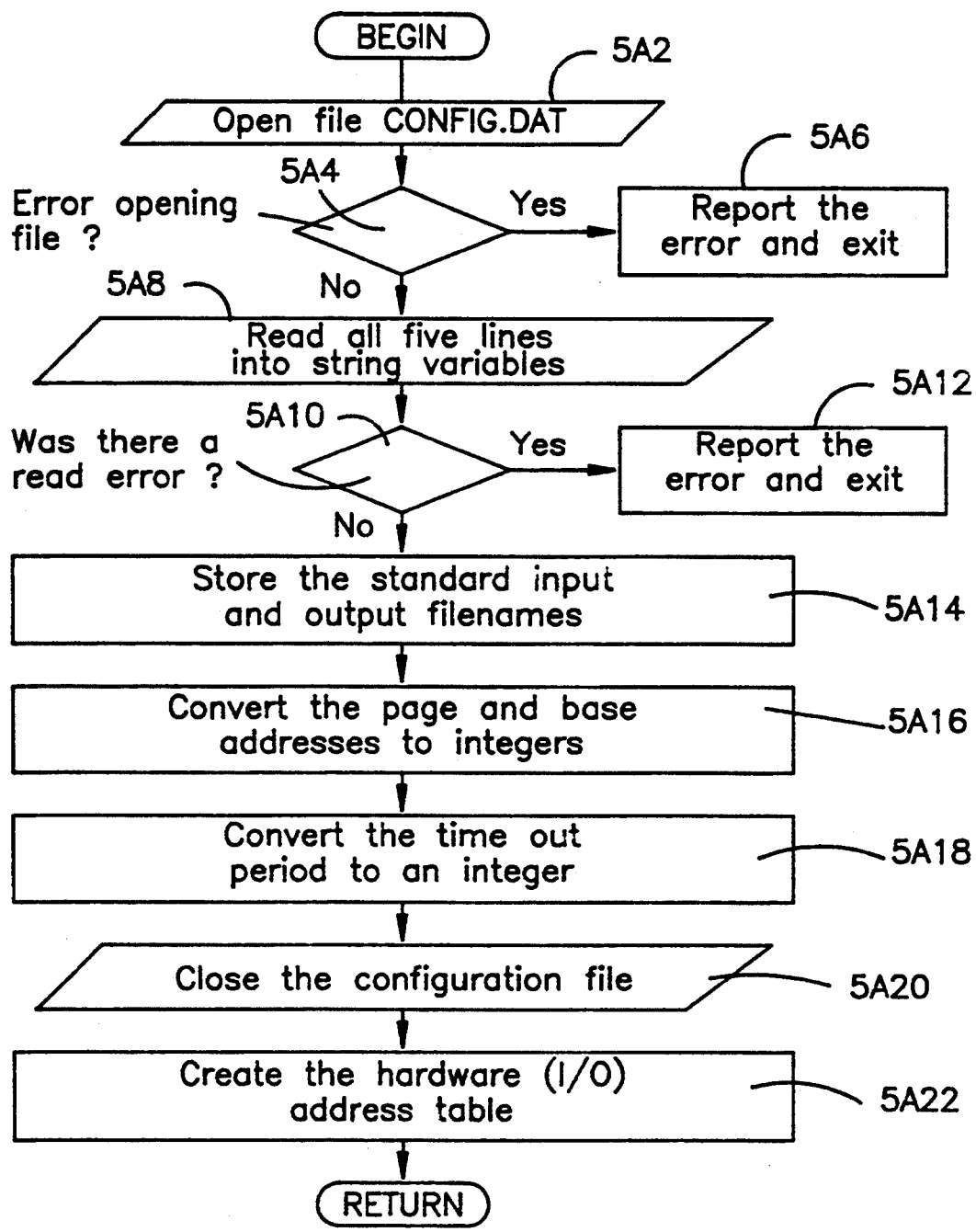
FIG. 5A is a detailed flow chart of block 5A of the FIG. 5 top level flow chart.
Figure 5B:
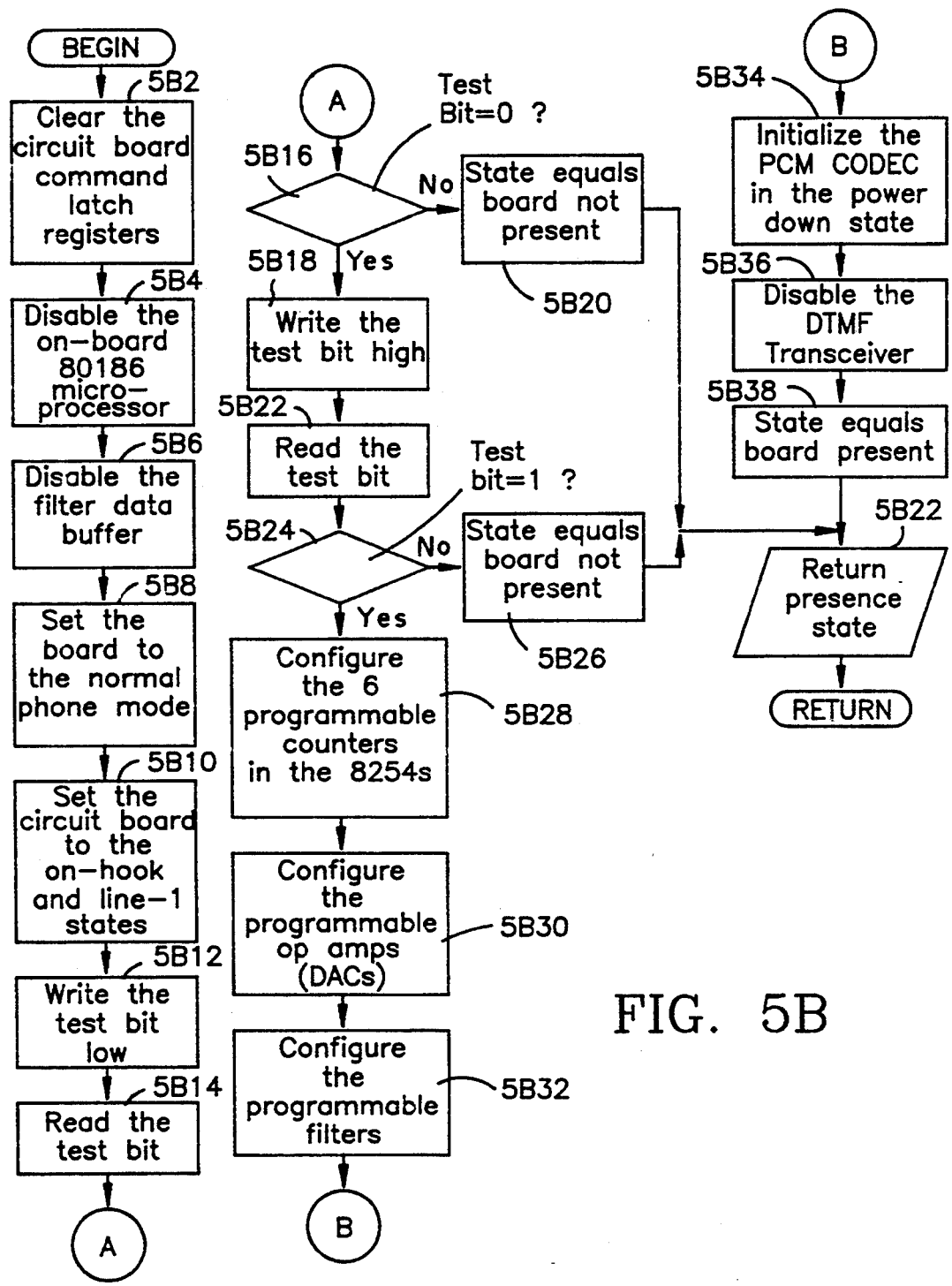
FIG. 5B is a detailed flow chart of block 5B of the FIG. 5 top level flow chart.
Figure 5C:
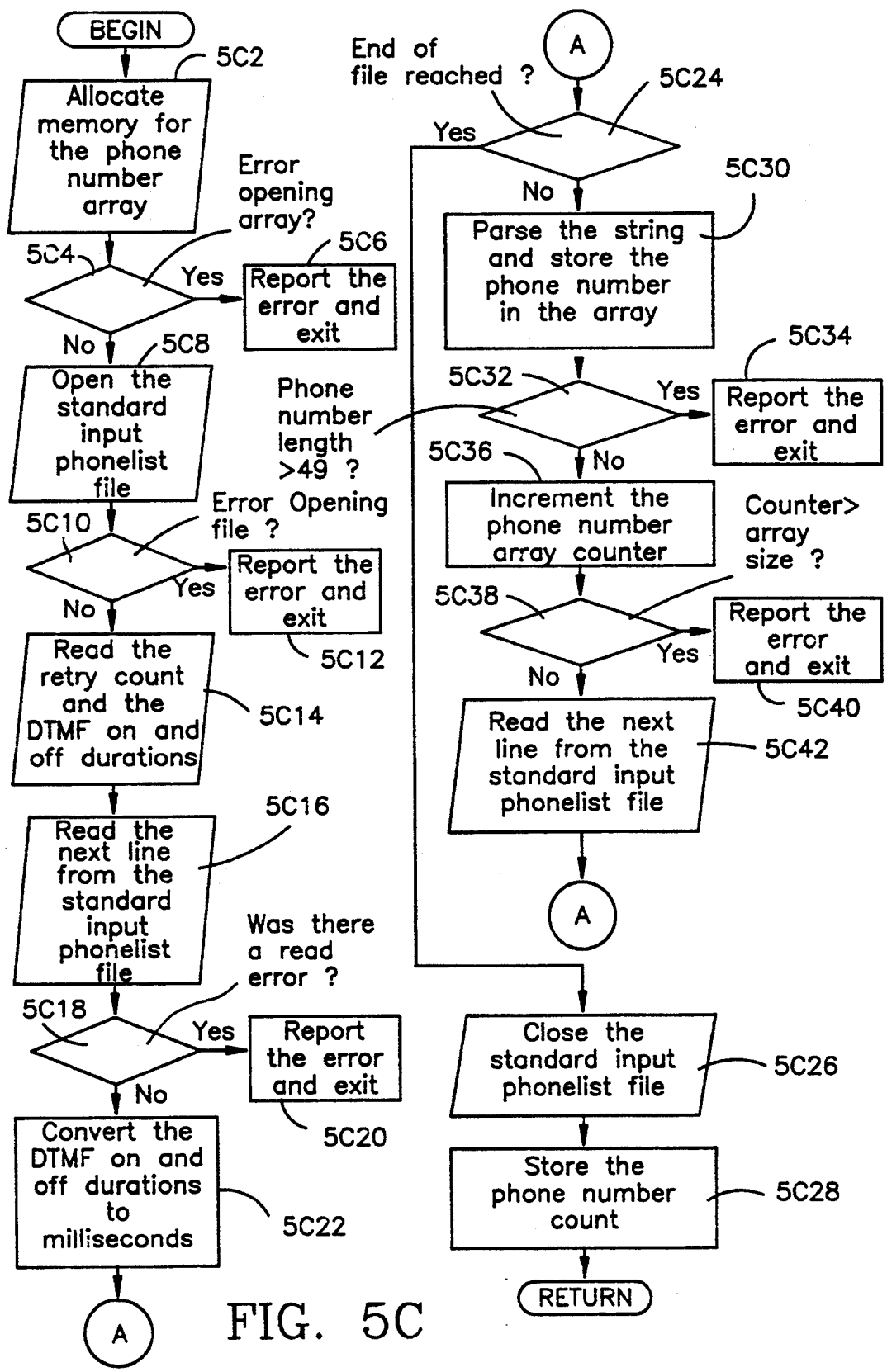
FIG. 5C is a detailed flow chart of block 5C of the FIG. 5 top level flow chart.
Figure 5D:
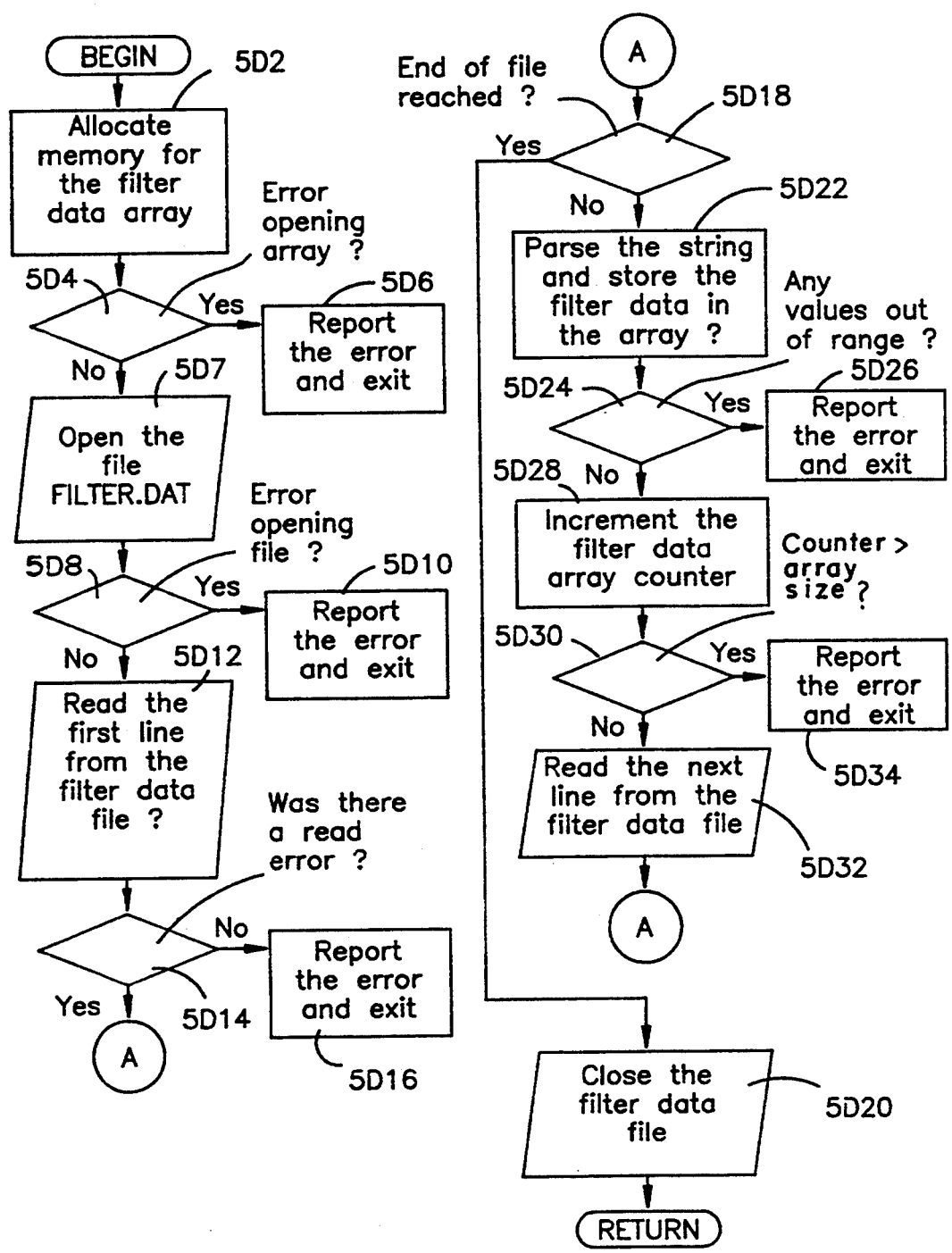
FIG. 5D is a detailed flow chart of block 5D of the FIG. 5 top level flow chart.

With reference to FIG. 5A, block 5A operates as follows. Beginning with block 5A2, the previously configured CONFIG.DAT file is opened. A detection of error is effected in decision block 5A4. If an error is detected in opening the configure file, the error is noted and the system exits at block 5A6. If not, the lines in the configuration file are read as string variables in block 5A8. Thereafter, a check is made on whether an error has been read in block 5A10. If there is indeed an error, again the system notes the error and exits per block 5A12. If not, the file names of the input and output files on the first and second lines of the configuration file are stored per block 5A14. Next, the page and base addresses of system board 700, which are used to test the integrity of the board itself, are converted to an appropriate format in block 5A16. A "time out" period is converted in block 5A18. Such time out period represents the time in which system board 700 goes off-hook, as for example 1 minute after the lack of any response from a called destination. The configure file is then closed via block 5A20, and an I/O address table is created in block 5A22 for setting up the partitions to the base addresses. Afterwards, the system returns to the flow chart FIG. 5 and proceeds to block 5B.

The system initializes the different components of system board 700 in block 5B. To put the initialization values on the different components, with reference to FIG. 5B, the system begins by clearing the registers in system board 700 at block 5B2. The latch registers are in essence a number of status relays that are provided in DAA 708 of system board 700. Next, on-board processor 724 and possibly co-processor 726, are disabled at block 5B4. The filter data buffer (not shown) for programmable filter 718 is disabled in block 5B6. System board 700 is next set to phone mode by initializing relay 42 at block 5B8, and then set to on-hook and connected to either one of telephone lines 702 or 704 via relay 706 in block 5B10. The next several blocks 5B12 to 5B26 test the presence of system board 700 in the system. Putting it differently, the appropriate addresses and jumper settings are set on system board 700. Assuming everything is correct, when a low test bit is written to system board 700, a low test bit should be read back. Conversely, if a high test bit is provided to system board 700, if everything is operating correctly, system board 700 should return an output high test bit. If the test bit is not equal to that provided, as represented in decision block 5B16, system board 700 is deemed not present in block 5B20. The system then returns to its present state at block 5B22 and exits to block 804 of the FIG. 5 flow chart. Thereafter, that system board is not present is reported, and the system stops operation per block 806.

Returning to FIG. 5B, the determination of whether system board 700 is present continues from block 5B18 to 5B26. If system board 700 is determined to be present and operational, six programmable counters in programmable counter/timer circuit 720 are configured per block 5B28. In essence, the values of CODEC transceiver 50, the respective frequencies for the programmable filters in programmable filters 718, and the standards for the outputs are set up in this step. Next, the programmable operational amplifiers in PGC 714 are configured at block 5B30, and the programmable filters in programmable filters 718 are configured per block 5B32. CODEC transceiver 50 is initialized to its power down state at block 5B34. In block 5B36, DTMF 52 is disabled. The power down of CODEC 50 and DTMF 52 ensures that no noise is generated by either. A state, for example 1, is then set up in block 5B38 to indicate that system board 700 is present in the system. The system returns to decision block 804 and proceeds to block 5C.

Per block 5C, the system reads and stores the phone number file. The operation of block 5C is amplified in FIG. 5C beginning with the allocation of the necessary memory for the phone number array in block 5C2. At decision block 5C4, a determination is made on whether there is any error in the phone file array. If the phone file does not exist, the system reports the error and exits per block 5C6. If there is no error, the system proceeds to open the phone list file at block 5C8. At decision block 5C10, a determination is made on whether there is an error in the phone list file. If there is, the system reports the error and exits per block 5C12. If there is no error, the system proceeds to block 5C14 and reads the retry count and the DTMF on and off durations.

In block 5C16, the next line from the phone list file is read. In decision block 5C18, whether or not there has been a read error is determined. If there is, the error is reported and the system exits at block 5B20. If there is no error, the DTMF on and off durations read from the phone list file are converted to time base units in block C22. A determination is next made on whether the end of the phone list file has been reached in decision block 5C24. If it has been reached, the phone list file is closed per block 5C26, the phone number count stored per block 5C28 and the system returns to the main program of FIG. 5. However, if the end of the phone list file has not been reached, then the system proceeds to block 5C30 and parses the string and stores the phone number in the previously allocated memory. A determination is next made in block 5C32 to ensure that the length of the phone number is valid. If it is not, an error is noted and the program exits per block 5C34. If the phone number is valid, the phone array counter is incremented in block 5C36. A determination is then made in block 5C38 on whether the size of the memory remains adequate. If not, an error is noted and the system exits per block 5C40. If yes, the next line is read from the phone list file per block 5C42 and the system returns to block 5C24 to repeat the process (from block 5C24 to block 5C42) until either an error is encountered, or the allocated memory runs out, or the end of the phone list file is reached.

A filter file is read and stored by the system in block 5D. See FIG. 5d. There, allocation of memory for the filter data array is made at block 5D2. Memory allocation, and reading and storing of filter data file are necessary because the programmable filters of programmable filter 718 need to have different frequency values to set up the different narrow band filters for different signal descriptions. The wide band filters, of course, were set up initially and their frequencies seldom change. For the FIG. 4 embodiment, it is assumed that the narrow band filters may have center frequencies from 300 to 3,300 Hz.

A filter file FILTER.DAT is then opened by the system per block 5D4 at which time whether there is an error in the file is determined. If there is, the error is recorded and the system exists per block 5D6. If there is no error encountered, the FILTER.DAT file is opened per block 5D8. In brief, FILTER.DAT file comprises a number of lines each containing a particular frequency, represented by a string of values, for tuning the programmable filters in programmable filter 718. The values, in addition to being provided to the programmable filters, are also written to programmable counter/timer circuits 720 which interact with the filters. The filter counters are set per block 5D2.

Returning to FIG. 5D, upon the opening of the FILTER.DAT file, if there is found an error per block 5D8, such error is recorded per block 5D10 and the system exits. If there is no error found, the system proceeds to block 5D12 and reads the first line of the FILTER.DAT file. If there is an error in the line read from the FILTER.DAT file as determined in block 5D14, the error is reported per block 5D16 and the system exits. If there is no error in the read filter file line, the system proceeds to block D18 to determine whether that line represents the end of the filter data file. If it is, the filter data file is closed per block 5D20 and the system returns to the main operation of FIG. 5. If, on the other hand, the end of the filter data file is not reached, the system proceeds to block 5D22 to parse the string and store the read data in the allocated memory.

A determination is next made on whether the read data is valid in block 5D24. If it is invalid, an error is generated and the system exits per block 5D26. If the data is valid. the allocated counter is incremented per block 5D28. As long as there is available counter space, as determined per block 5D30, the next line in the data file is read per block 5D32. The system returns to block 5D18 until the end of the filter data file is reached. If there is insufficient storage space, an error is generated and the system exits per block 5D34.

After block 5D, the system proceeds to block 808 of the FIG. 5 flow chart to initialize the output buffer in the main memory. Such buffer may be resident, for example, in computer interface circuit 64, memory 728, or Dram 730, depending on whether processor 66 or on-board processor 724 controls the operation of system board 700.

Figure 5E:
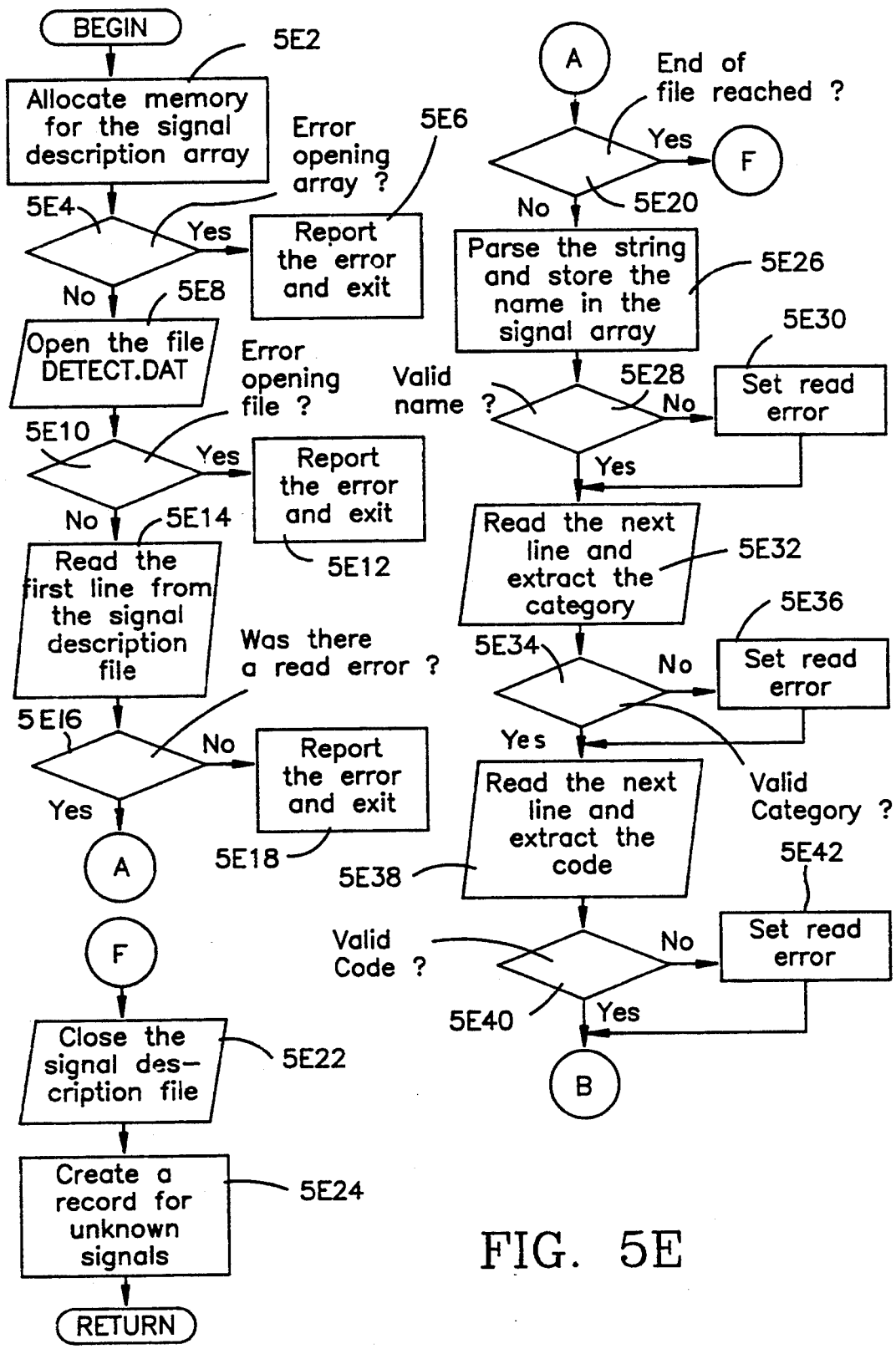
Figures 1, 5E:
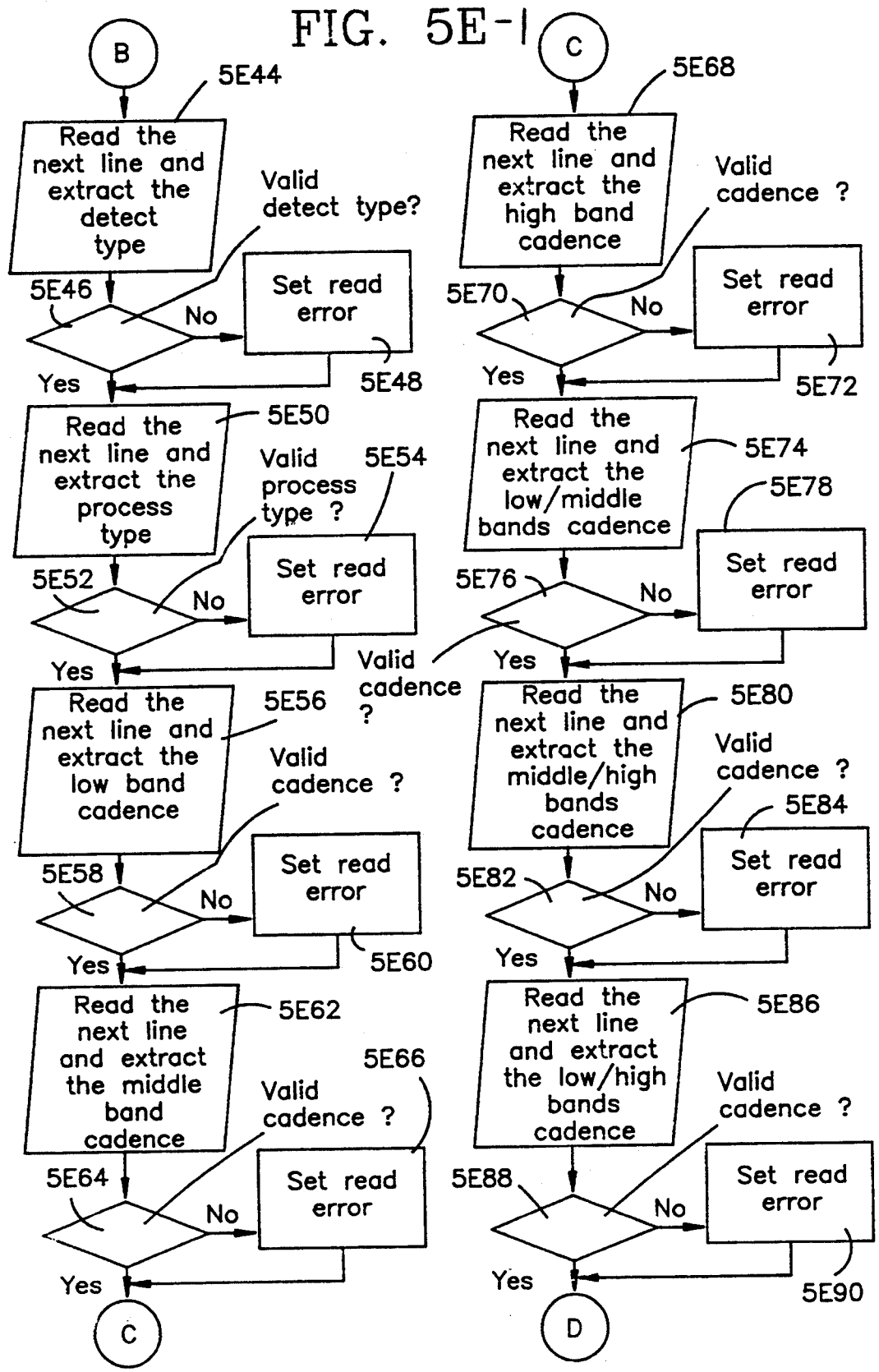
Figures 2, 5E:
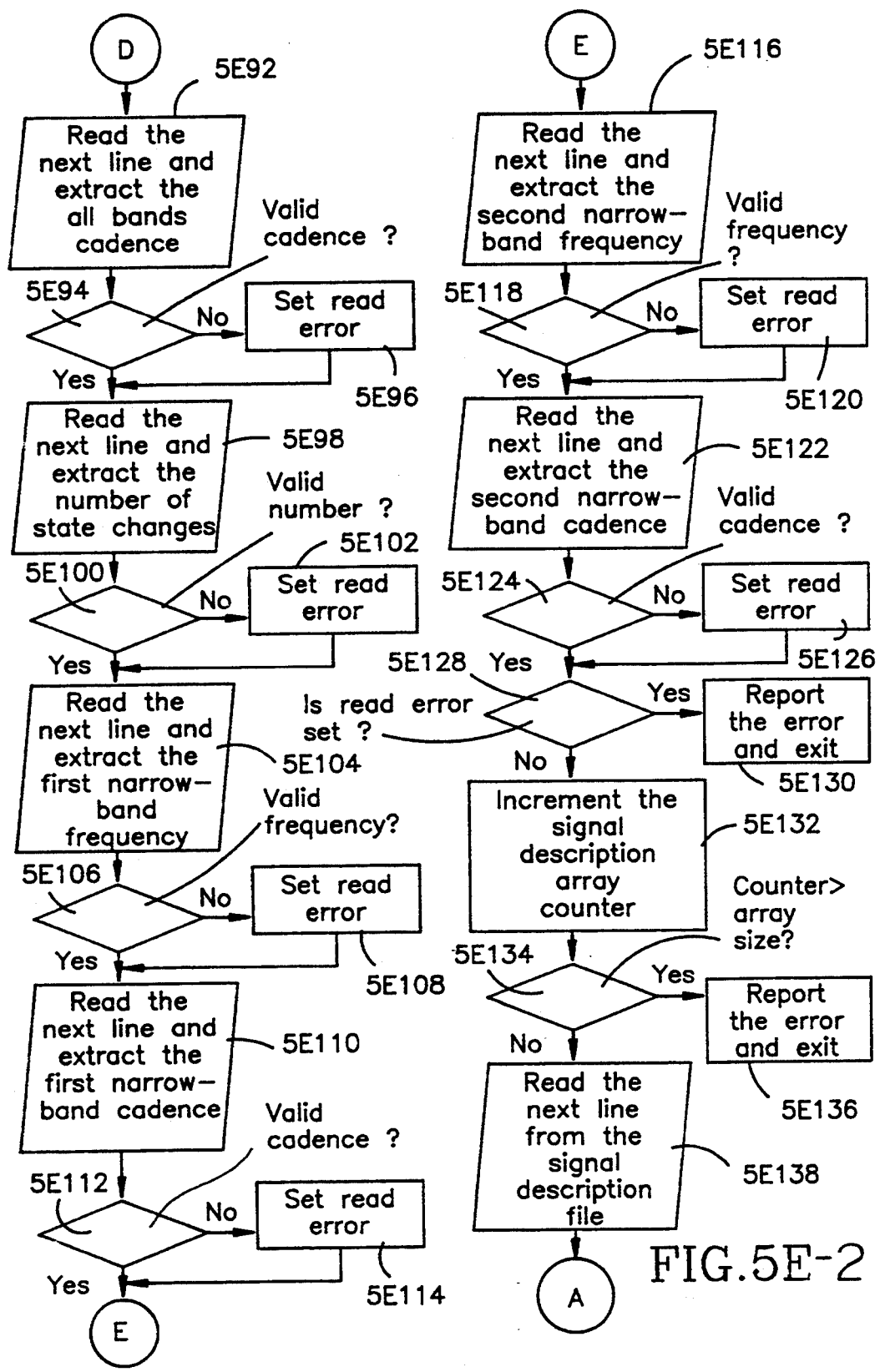
Figures 3, 5E:
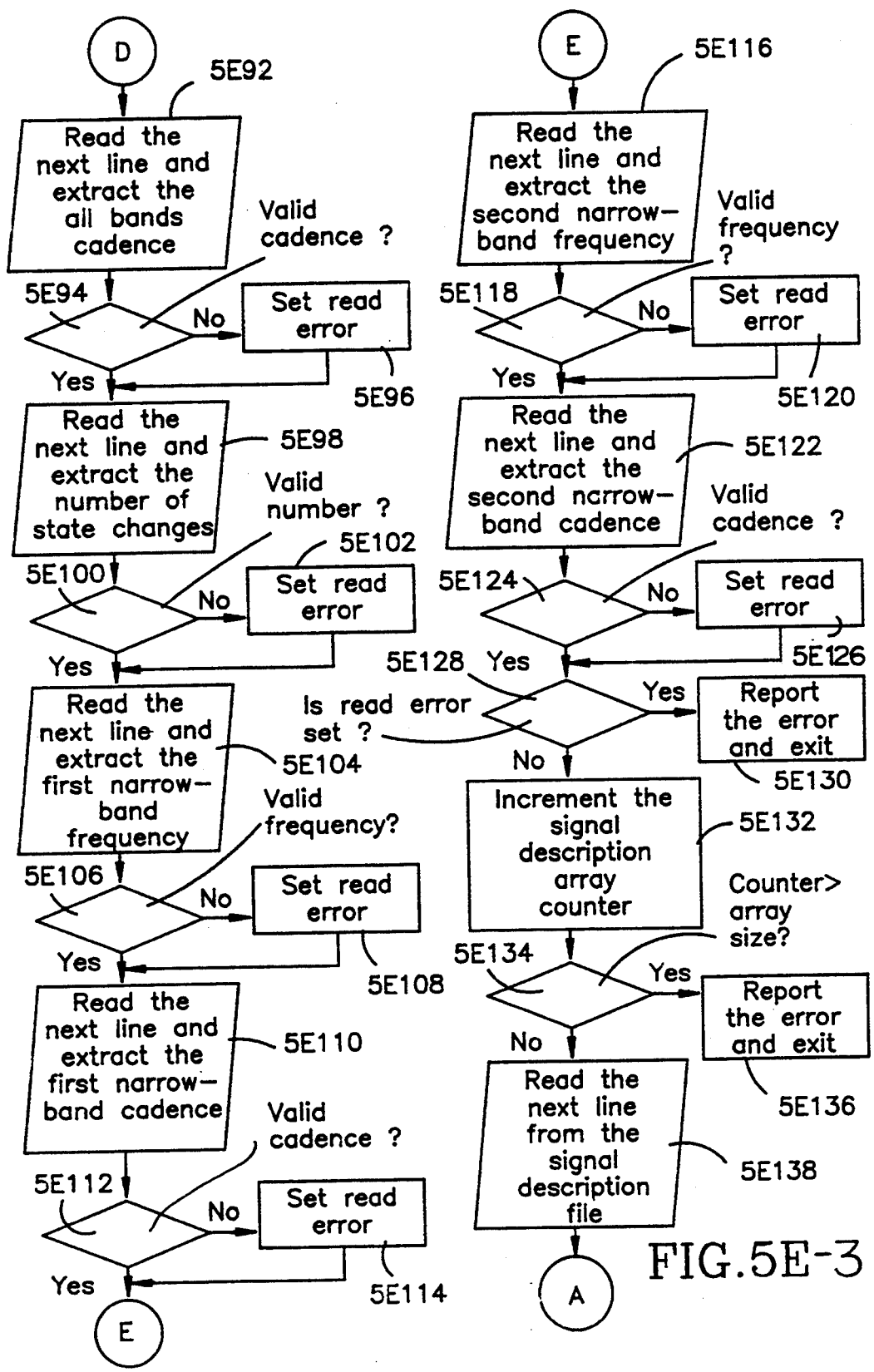
Figure 5F:
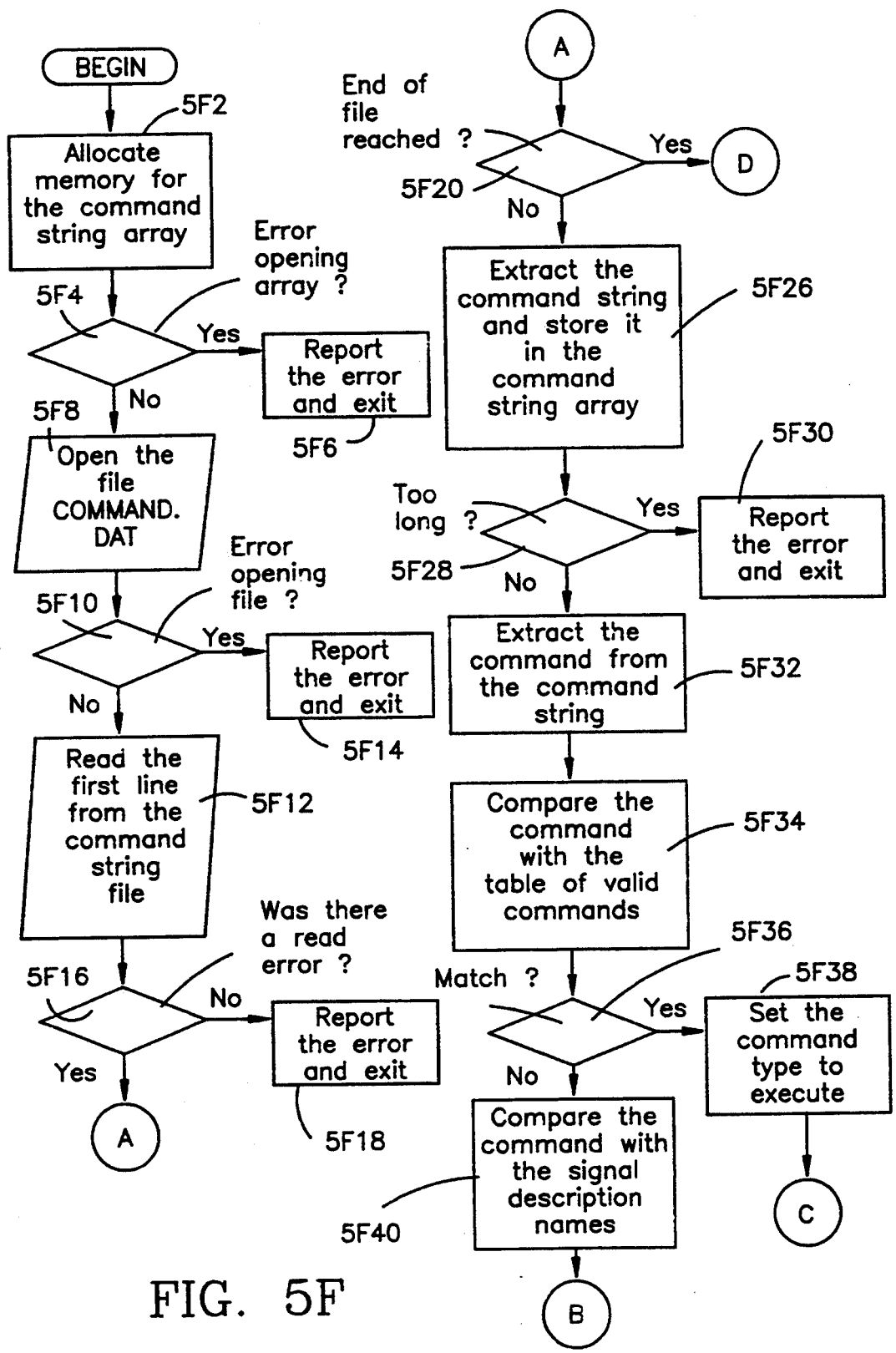
Figures 1, 5F:
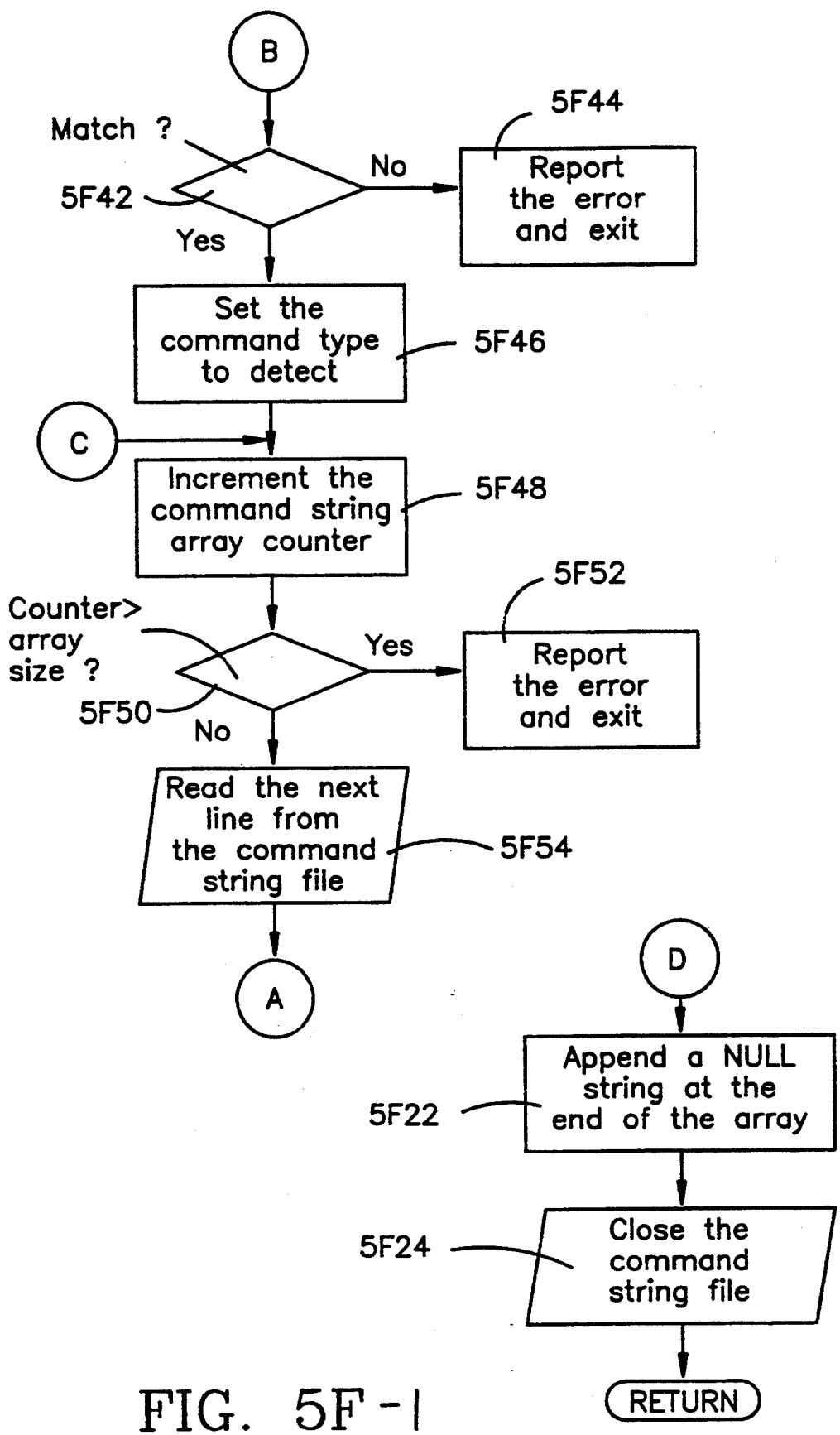

The operation of the system next proceeds to block 5E to read and store the signal description records, the detailed description of which is given in FIG. 5E. As shown in block 5E2, an appropriate amount of memory for the signal description array is allocated. Next, in block 5E4, whether any error is encountered in opening the signal description array is determined. If there is, an error is reported and the system exits per block 5E6. If no error is encountered, the system proceeds to open the DETECT.DAT file at block 5E8, and whether any error is encountered in opening the DETECT.DAT file is determined per block 5E10. If there is an error, the system reports the error and exits per block 5E12. If no error is encountered, the system proceeds to block 5E14 and reads the first line from the signal description file, a number of which were noted above. An error check is made on the read in line per decision block 5E16. If an error is encountered, the system reports the error and exits per block 5E18. If no error is encountered, a determination is made per block 5E20 on whether the end of the file is reached. If yes, the signal description file that is being read is closed per block 5E22. After which a record is created based on the read signal description in block 5E24. Thereafter the system returns to the main operation flow chart of FIG. 5.

However, if the end of the signal description file is not reached, then per block 5E26, the string is parsed and the name of the read signal is stored in the allocated memory. Whether or not the name of the read signal is valid is determined in decision block 5E28. If it is invalid, an error is generated in block 5E30 and the next line of the signal description file is read to extract the category of the signal in block 5E32. If the name is valid, the same process is repeated, minus the generated error. The system next proceeds to read each line of the being read DETECT.DAT file, as for example the dial tone signal shown above. Thus, starting with block 5E32, the type of category of the signal is read. At block 5E38, the code pertaining to signal is extracted. The detect type of the signal is read in block 5E44. The process type is extracted in block 5E50. The low band cadence is read and extracted in block 5E56. The middle band cadence is extracted in block 5E62. The high band cadence is extracted in block 5E68. The low/middle band cadence are extracted in block 5E74 etc. until every line of the signal from the signal description file is read. And for each of the read lines, a determination is made on whether or not the read information is accurate. Thus, by block 5E122, all of the lines of the signal per its signal description file have been read. And if there is a read error per block 5E128, this error is reported and the systems exits per block 5E130. If there is no error, the system increments the signal description array counter per block 5E132. Thereafter, a decision is made on whether the allocated description array still has sufficient space to read the next signal from the next signal description record in block 5E134. If there is insufficient space, an error is generated and the system exits per block 5E136. If there is sufficient space, the system proceeds to read the next signal description per block 5E138.

Thus, the system basically loads the above noted DETECT.DAT files into its allocated memory as templates to enable it to compare any incoming signal with those templates to determine whether or not the incoming signal is a particular type of signal. For example, assuming it has loaded the dial tone, bong, voice, ring, busy, and reorder signal descriptions as signature templates, the system of the FIG. 4 embodiment can easily discriminate the type of signal it encounters, as its programmable filters are set to the respective particular Frequencies as determined by a particular signal description template.

After the appropriate descriptions of the different signals, if more than one, are read in block 5E, the operation of the system proceeds to block 5F to read and store the command string file. With specific reference to FIG. 5F, the reading and storing of the command interpreter file COMMAND.DAT is performed as follows. At block 5F2, the required memory is allocated. A determination is then made on whether an error has been detected when the command string array is opened in block 5F4. If there is an error, it is reported and the system exits at block 5F6. If no error is encountered, per block 5F8, the COMMAND.DAT file of interest, such as for example one of the for sample COMMAND.DAT files shown above, is opened per block 5F8. If no error is encountered per block 5F10, the first line from the COMMAND.DAT file is read per block 5F12. If there is an error, such is reported and the system exits per block 5F14.

A determination is next made on whether there is a read error after the reading of the first line per block 5F16. If there is error, such is reported and the system exits per block 5F 18. If there is no read error, per decision block 5F20, a determination is made on whether the end of the command file is reached. If it has, the system proceeds to block 5F22 to append a null string at the end of the command string array. Thereafter, the command string file is closed per block 5F24 and the system returns to the main operation program.

If the end of the command file is not reached, the command string is extracted and stored in the command string array per block 5F26. Whether or not the command string is valid is determined in block 5F28. If it is, an error is reported and the system exits per block 5F30. If the command string is valid, the command is extracted per block 5F32. The thus extracted command is compared with the table of valid commands established previously per block 5F34. Depending on whether or not there is a match, per block 5F36, either the command type to execute is set per block 5F38 or the extracted command is compared with the signal description names stored per block 5E in block 5F40. If the comparison of the extracted command with the signal description names does not produce a match per block 5F42, an error is reported and the system exits per block 5F44. If, however, a match is made, the command type to detect is set per block 5F46. Thereafter, the command string array counter is incremented per block 5F48. And depending how much space of the counter array remains per block 5F50, either the system reports an error and exits per block 5F52 or proceeds to read the next line from the command string file per block 5F54. Thereafter, the system proceeds to block 5F20 to repeat the same process until the end of the file is reached. At which time the system returns to the main flow chart of FIG. 5.

Thus, with the block 5F process, taking for example the above disclosed sample dial to voice after bong command strings, the system would first go off-hook, listen for a dial tone, and dial the appropriate telephone number to reach a chosen destination. And once the bong tone is received, dialing proceeds to the final destination and the system waits for a voice answer. Upon receipt of the voice answer, a recorded message is played and the system returns to on-hook. With the playing of the recorded message, it should be noted that system board 700 can interactively correspond with a called destination in that a first recorded message may provide the person who gave the voice answer at the called destination certain choices, to be chosen by pressing the appropriate keys of the telephone key board, i.e. generating different DTMF tones. Upon receipt of the appropriate tone, a second recorded message can be played to the listener to again request a certain type of answer that may include voice for recording. This process can proceed indefinitely to effect an interactive correspondence between the system of the FIG. 4 embodiment and the speaker at the destination. In essence, therefore, a command string may be equated to a given program that can provide interactive correspondence between the system and any destination. It should be appreciated, however, that the reading and storing of command strings from the command files per block 5F is but one of the many initialization steps of system board 700 before a chosen destination is called.

Figure 5G:
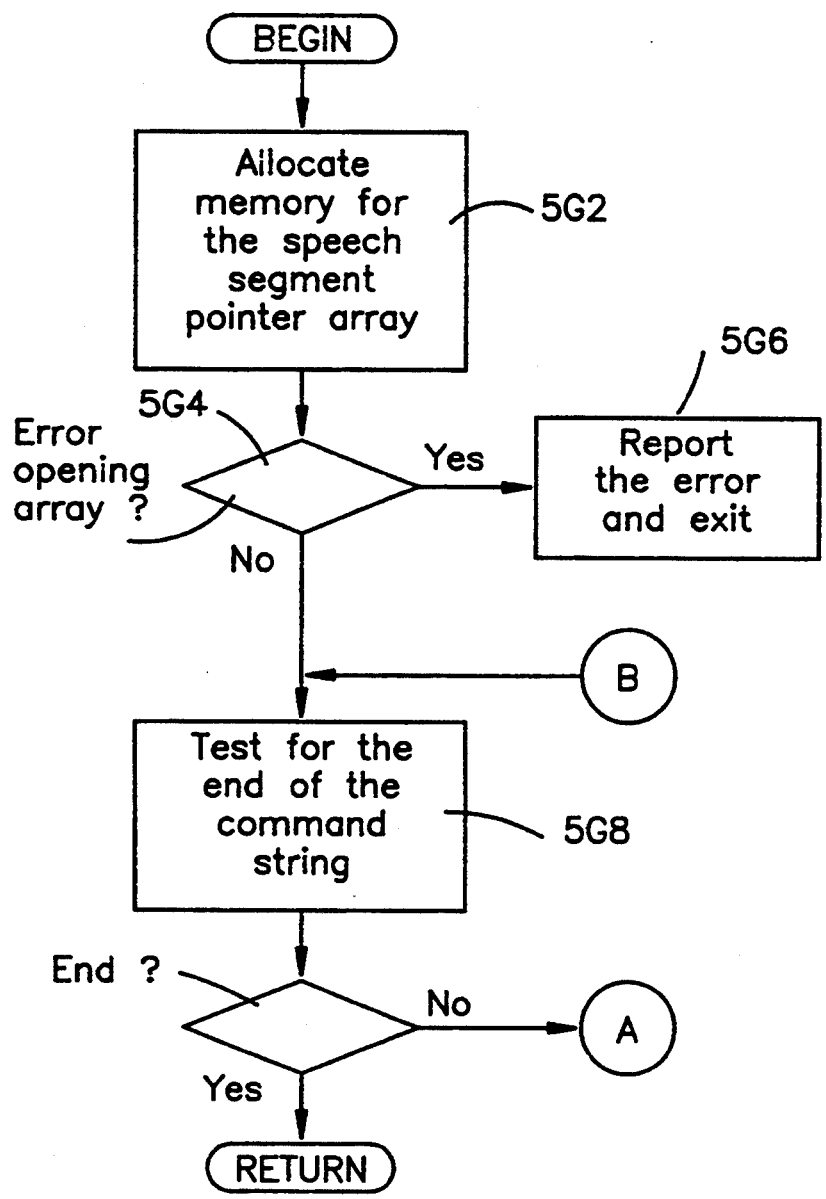
Figures 1, 5G:
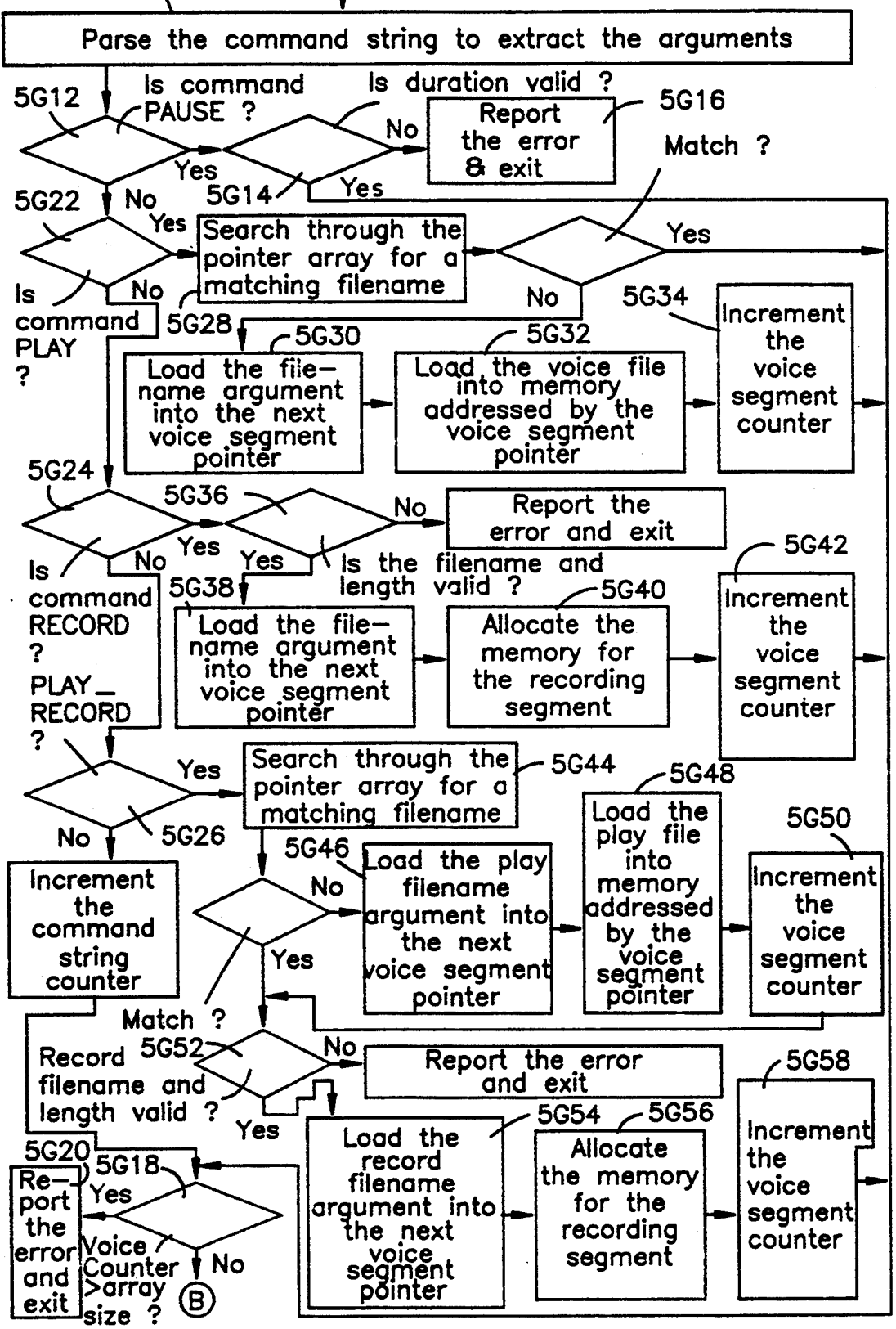

Returning to FIG. 5, the system of the FIG. 4 embodiment is further initialized in preparation for processing phone calls by reading and storing voice segment files in block 5G. With reference to FIG. 5G, the reading and storing of voice segments from voice segment files begins with the allocation of the necessary memory for the speech segment pointer array in block 5G2. Like the other subroutines, a determination is made, per block 5G4, on whether any error is encountered when opening the speech segment pointer array. If there is, the error is reported and the systems exits per block 5G6. If there is no error, whether or not the end of the command string is reached is determined in block 5G8. If it is, the system returns to the main operation flow chart of FIG. 5. If not, the system proceeds to block 5G10 to parse the command string to extract the particular type of arguments in the string. Before providing further detail of the FIG. 5 flow chart, it should be appreciated that it is in this subroutine that the system determines what type of voice responses are necessary upon receipt of a voice answer, or any other discriminated tone that requires a voice response. Thus, the FIG. 5G subroutine provides for execute commands of either play, record, or a combination of play and record at the same time. Further, by storing different segments of speech, a complete sentence may be constructed via different bits of speech segments. Thus, an intelligent interactive correspondence may be carried out between a called destination and the system of the present invention.

As for the simultaneous play and record functions, it should be appreciated that this option is available for the instant invention system interfaced through DAA 708. Accordingly, not only can the system of the present invention interactively correspond with a destination, it can also provide for all types of testing of the characteristics of the telephone network. For example, an "echo" test may be performed in which a pulse is sent into the telephone network and the response thereof from the network is measured. And the performance characteristics of the telephone network can accordingly be ascertained by measuring the energy level of the echoed pulse, and comparing the same with that of the sent pulse.

Thus, returning to FIG. 5G, after the command string is extracted by block 5G10, a decision is made on whether the extracted command string is a command pause at decision block 5G12. If it is, whether or not its duration is valid is determined in decision block 5G14. If it is invalid, the system reports an error and exits per block 5G16. If the duration is valid, the system proceeds to decision block 5G18 to determine whether the voice counter has exceeded the speech segment pointer array. If it has, an error is reported and the systems exits per block 5G20. If it has not, the system proceeds to block 5G8 to test whether it is the end of the command string.

If the command is not a pause, the system proceeds to respective decision blocks 5G22, 5G24, and 5G26 to determine whether the command is a play, a record, or a play/record. Depending on what command is determined, a different set of actions is undertaken. For example, if the command is determined to be play from decision block 5G22, a search is conducted through the pointer array for a matching file name in block 5G28. If there is a match, a determination is made in block 5G18 on whether the voice counter exceeds the array size. If it does not, the whole process begins afresh. If it has, the system exits. And if there is no match between the command play and the file name, the file name argument is loaded into the next voice segment pointer per block 5G30. The voice file is then loaded into the memory to be addressed by the particular voice segment pointer per block 5G32. Thereafter, the voice segment counter is incremented per block 5G34 and the system again proceeds as before.

A second loop occurs when the command is found to be a record. If it is determined that the command is a record command, whether or not it is valid is determined in decision block 5G36. If it is a valid command, the file name argument of the command is loaded into the next voice segment pointer per block 5G38. A sufficient amount of memory is allocated in block 5G40 and the voice segment counter is incremented per block 5G42. After that subroutine, the program again returns to block 5G8 tbr testing the end of the command string.

If the command is determined to be a play/record command per block 5G26, a search is performed through the pointer array for a matching file name per block 5G44. If there is no match, the file name argument is loaded into the voice segment pointer per 5G46. The play file is then loaded into the memory addressed by the voice segment pointer per block 5G48. Thereafter, the voice segment counter is incremented per block 5G50 and the system returns to decision block 5G52 to determine whether the record file name and its length are valid. If they are valid, the record file name argument is loaded into the next voice segment pointer per block 5G54. The appropriate memory allocated for the recording segment is performed in block 5G56 and the incrementation of the voice segment counter is effected in block 5G58. Thereafter, the system proceeds to decision block 5G18 and the process is repeated until the end of the command string is reached.

Returning to FIG. 5, after block 5G is finished, the system proceeds to block 808 to set system board 700 to phone mode by setting relay 42 on board 700.

Next, per block 810, the monitor to which the system of the present invention is connected is cleared and appropriate header information, as for example the date and time of the testing, is provided. The output record header is written to the output buffer, initialized in block 808, in block 812. The signal detection enable flags which were allocated in block 5E are reset to initialize system board 700. Thereafter, the phone call is processed per block 5H.

Figure 1:
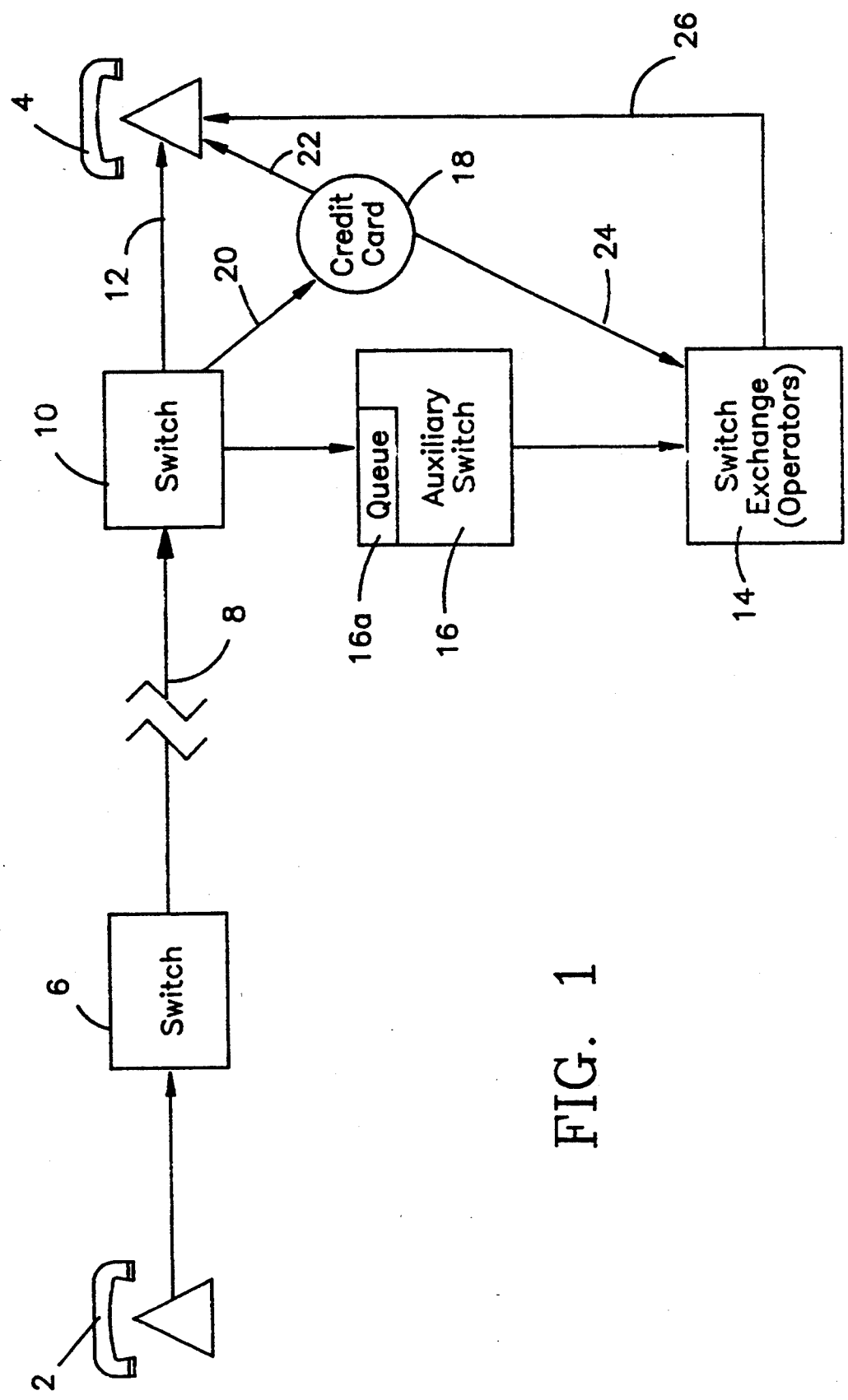
FIG. 1 is an overall view of a telephone network.
Figure 5H:
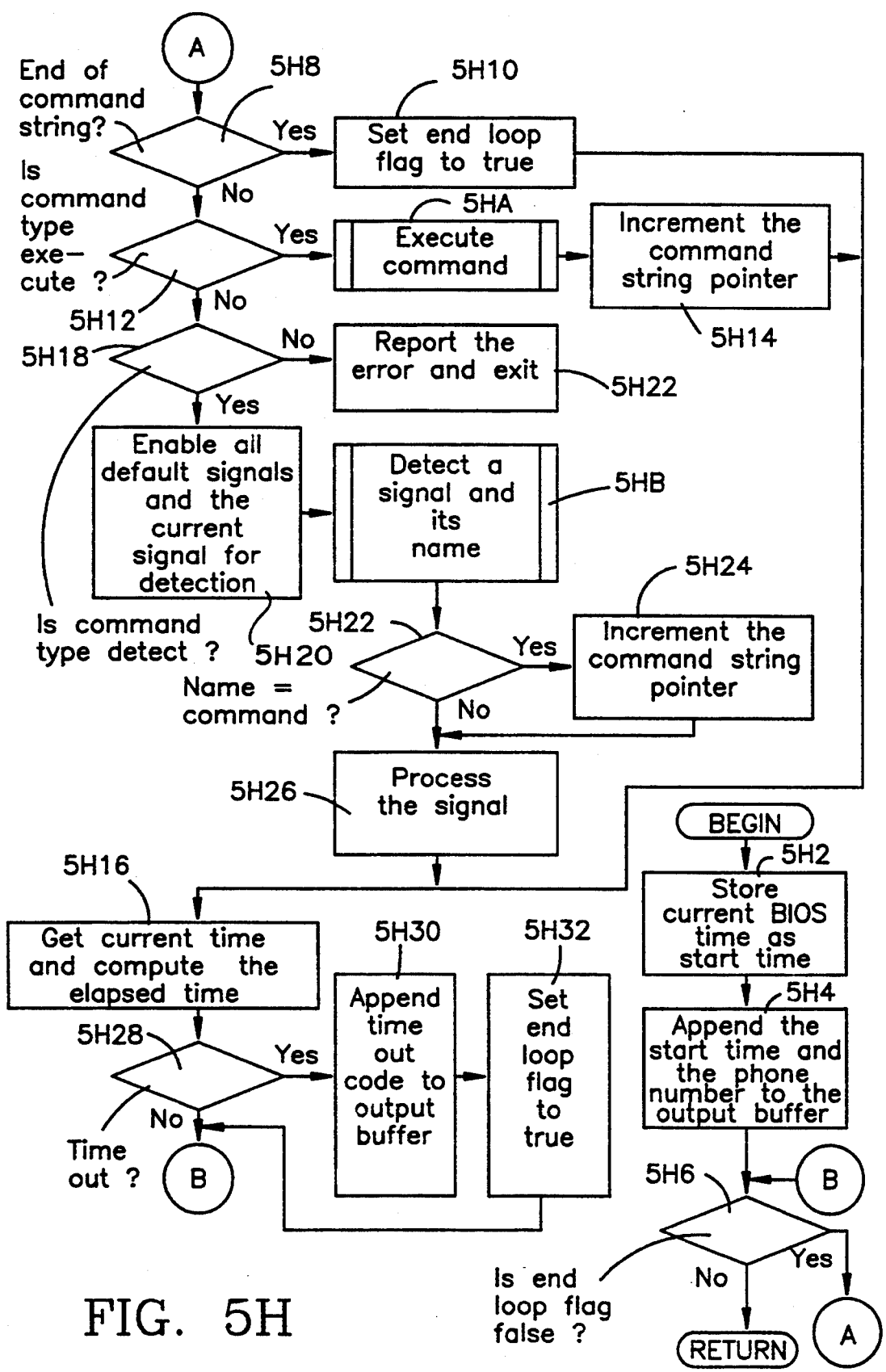
FIG. 5H is a detailed flow chart of block 5tt of the FIG. 5 top level flow chart.
Figures 1, 5H:
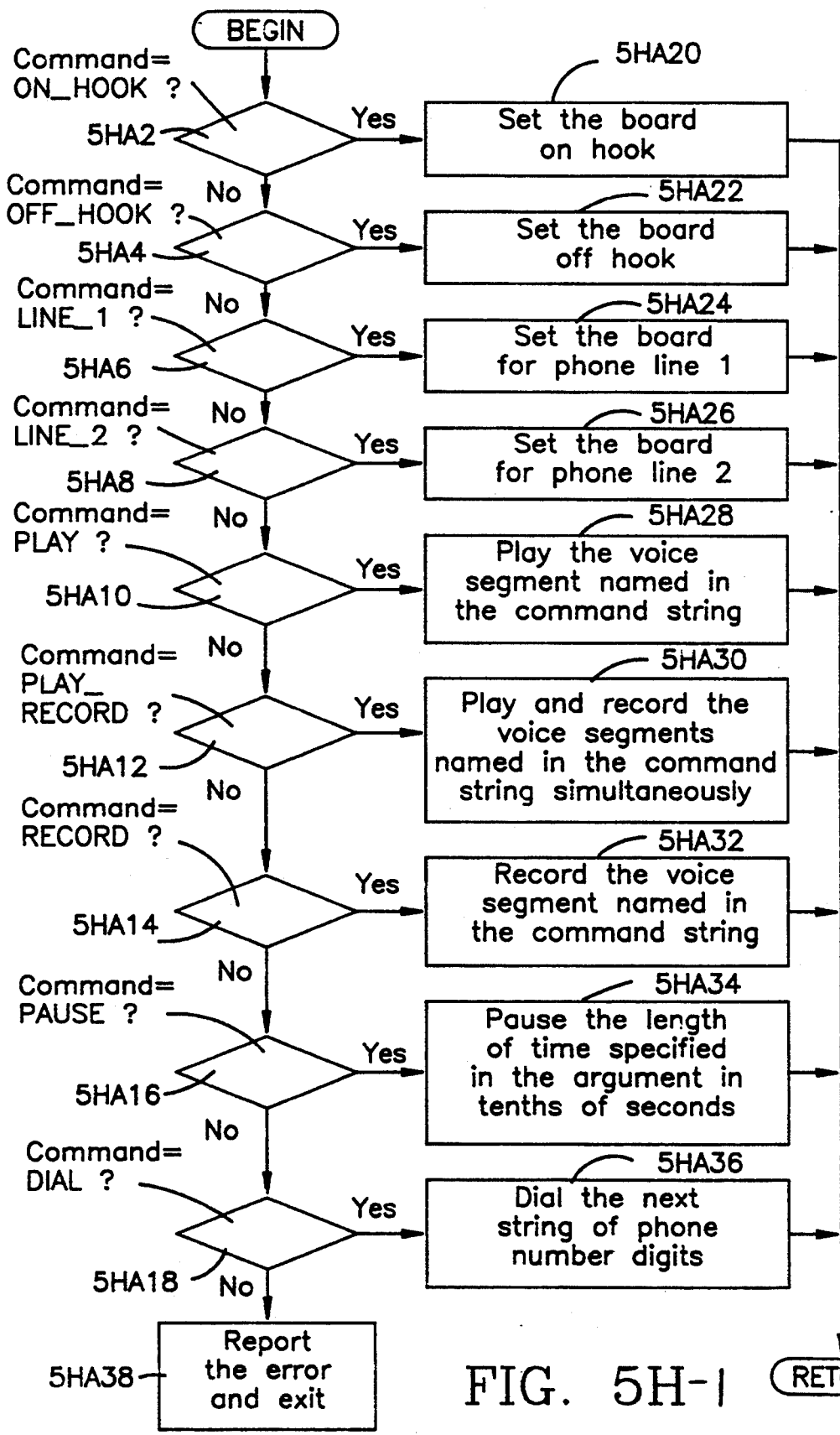
Figures 2, 5H:
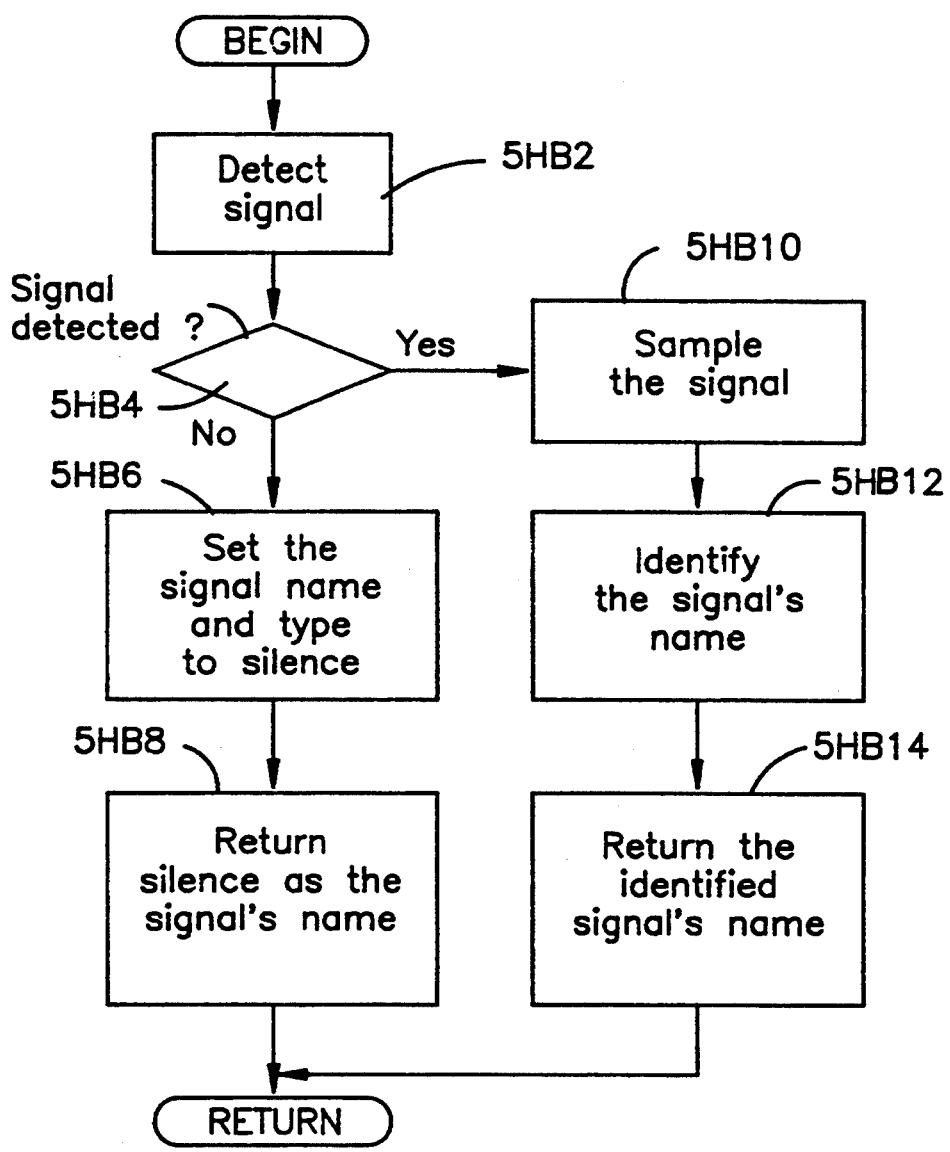

With referencing FIG. 5tt, the detailed processing of one phone call is given with reference to FIGS. 5H-1 and 5H-2. As shown, the processing of one phone call begins when the current time of the evaluation unit is stored in block 5H2. This time of course serves as the start time for the beginning of the phone call. The start time and the phone number to which the system is to dial are appended to an output buffer per block 5HA. A determination is then made in block 5H6 to see whether or not any condition has been reached which would signal that the end of the phone call has been reached. If it has, the system returns to the main flow chart of FIG. 5. If it has not, the system proceeds to decision block 5H8 to determine whether it is the end of a command string. If it is, an end loop flag is set per block 5H10. If it is not, a determination is made in block 5H11 to determine whether it is an execute command. If it is, a subroutine, to be discussed with reference to FIG. 5H-1, is performed in block 5HA. Thereafter the command string pointer is incremented in block 5H14 and the system proceeds to block 5H16 to retrieve the system time to compute the total elapsed time of the present call. If the command is determined to be a detect type of command in block 5H18, the system proceeds to enable all default signals and the current signal for detection in block 5H20. If not, an error is reported and the system exits per block 5H22. After the function of block 5H20 is performed, the system proceeds to the next subroutine of detecting a signal and determining its name in block 5HB, to be discussed in detail with FIG. 5H-2.

Whether or not the signal detected was the expected signal listed in the command string is determined in decision block 5H22. If it is, the command string pointer is incremented in block 5H24 and the system proceeds to block 5A26 to process the signal and then proceeds to block 5H16 to obtain the elapsed time. If it is not, the system proceeds to process the signal in block 5H26, after which the system proceeds to block 5H16 to obtain the clasped time. The processing of the signal was discussed previously with respect to the discussion of one of the sample command strings, and therefore will not be further discussed herein. At block 5H28, whether time out is determined from the elapsed time. If yes, the time out code is appended to the output buffer per block 5H30 and an end flag set per block 5H32. Thereafter, the system returns to block 5H6 to begin the process anew. If there is no time out, the system directly proceeds to block 5H6 to repeat the process.

As for execute command block 5HA, attention is directed to FIG. 5H-1 in which a list of decision command blocks 5HA2 to 5HA18 are listed. Each of these decision blocks represents a particular command, as tbr example the command of play in block 5HA10. Thus, when an execute command is determined in block 5H12 (FIG. 5H), and the system proceeds to block 5HA, a determination is made sequentially along decision block 5HA2 to 5HA18 to determine the type of command the system is presented with. And depending on the type of command, a particular type of action is performed. For example, with an on-hook command, system board 700 is set on-hook per block 5HA20. Likewise, if the command is an off-hook command, system board 700 is set off-hook in block 5HA22. System board is set tbr phone line 1, for example telephone line 702, in block 5HA24 when the execute command is determined to be line 1 per block 5HA6. When the command is determined to be line 2 per block 5HA8, system board 700 is set to telephone line 2, for example lines 704, per block 5HA26. When a command is determined to be play, a chosen voice segment named in the command string is played per block 5HA28. When the command is determined to be play/record, chosen voice segments are played out for the destination listener while at the same time, the listener's response is being recorded in block 5HA30. When a command is deemed to be "record" in block 5HA14, the voice segment is recorded in block 5HA32. When there is a pause command, per block 5HA16, a given time pause is provided per block 5HA34. When there is a dial command per block 5HA18, the next string of the phone number digits is dialed per block 5HA36. After the functions are per/brined according to each of the corresponding command, the system returns to block 5H14 of the FIG. 5H flow chart to increment the command string pointer. If the system encounters an error, it is reported and the system exits per block 5HA38.

The detection of a signal and its name per block 5HB of the flow chart of FIG. 5H is per/brined in accordance with the flow chart of FIG. 5H-2. There, the signal is detected per block 5HB2. Whether or not a signal is detected is determined by decision block 5HB4. If there is no signal detected, the signal name is set to silence per block 5HB6. Thereafter, silence is returned as the signal name per block 5HB8. If, however, a signal is detected per decision block 5HB4, that signal is sampled per block 5HB10. The sampled signal is then identified by its name per block 5HB12. After which the identified signal's name is returned per block 5HB 14 and the system proceeds to decision block 5H22 of the FIG. 5H flow chart. Thus, the routine performed by the flow chart of FIG. 5HB, in essence, looks for a signal to be detected. And if the signal is detected, the system would sample it and look at the three band filter outputs. After recording it, it does a best fit and identifies the signal's name. As for the identification of the signal name, it should be appreciated that the image of what is detected, per blocks 5HB2 and 5HB10, is matched against the previously stored signal descriptions, as for example whether the identified signal is a busy signal, a voice, modem, reorder, etc.

Returning to FIG. 5, after block 5H, the system proceeds to set system board 700 on-hook and pause for 2 seconds, per block 816, to ensure that the telephone network would not confuse the next call with the just finished call. Output record footer is added to the output buffer per block 818, and appended to the output file per block 820. Audio recordings are written to record disks per block 822. Thereafter, whether a test buffer is enabled is determined in block 824. If it is, the information of the test buffer is appended to the test file, discussed previously, per block 826, and the system proceeds to decision block 828. If not, the system directly proceeds to decision block 828, where whether there are additional phone numbers to be processed is determined. If there is, the system advances to block 830 to retrieve the next phone number and thereafter return to block 810 to repeat the above-discussed process. If not, the system proceeds to decision block 832 to determine whether the phone number list is to be retrieved, i.e. redialed. If yes, the system proceeds, per block 834, to the top of the phone list and then to block 810 to repeat the process anew. If there is no retry, the system ends.

Figure 6:
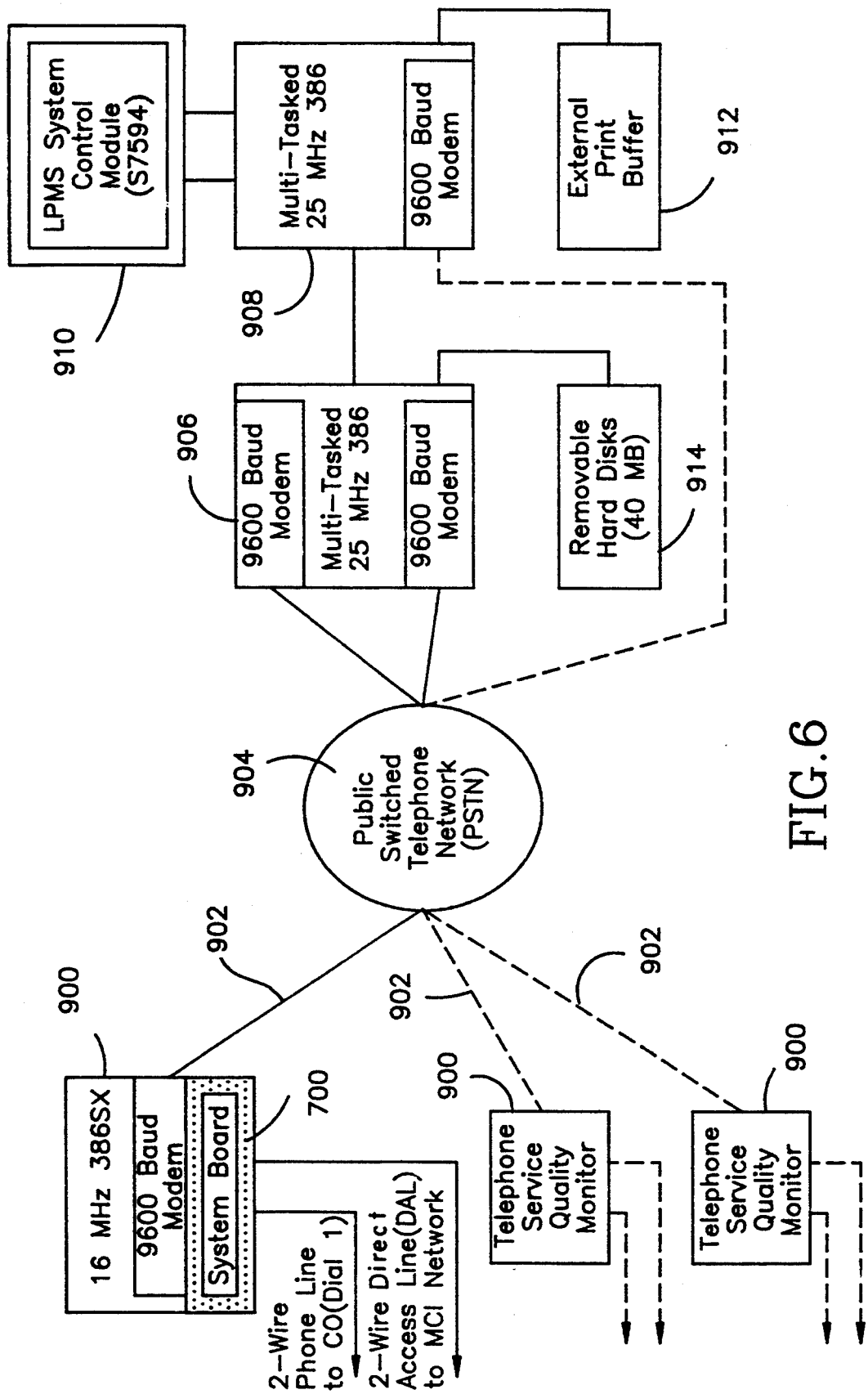
FIG. 6 is a simplified schematic illustrating an overall telephone network quality measurement system utilizing the second embodiment of the present invention.

The TQMS evaluation unit, which includes system board 700 of FIG. 4, as noted previously, is similar to the board of FIG. 2 in that it is in the form of an expander card inserted into one of the available expansion slots of a PC, for example a 16 MHz 386 SX computer. As shown in FIG. 6, system board 700 is added to a conventional computer system 900 in which there is also equipped a 9600 baud modem. It should be appreciated that albeit a 386SX 16 MHz computer equipped with a 9600 baud modem is shown, other types of personal computers including other Intel family microprocessor equipped computers and modems having a baud rate other than 9600 may also be used. In any event, as shown in FIG. 6, for the present invention measurement system, there is a plurality of TQMSs 900, for example 18, located across the telephone network. These lines are connected to a public switch telephone network (PSTN) 904 but are shown separately because they are circuits under test. Each of the TQMSs has connected thereto up to two telephone wires, as for example lines 702 and 704 of FIG. 4. Each of the TQMSs is connected to PSTN 904 via its modem connection 902. Further connected to PSTN 904 is a network server 906 in which a multiple number of modems, for example 9600 baud modems, are equipped. For the shown network server 906, a 386DX 25 MHz PC is shown. However, similar to what was discussed with respect to the TQMSs, network server 906 may comprise a more powerful PC having Intel 486 or equivalent manufacturer chips to perform multitasking and archiving of any downloaded data. A number of 9600 baud modems are equipped in network server 906. Further equipped with network server 906 is, for the FIG. 6 embodiment, a removable hard disk, which, in spite of the shown 40 MByte, may actually have a larger capacity for storing the archived data. Of course, instead of a single network server, a multiple number of network servers can also be used.

To provide management the ability to evaluate the characteristics of the telephone network, connected to network server 906 is a PC computer 908 (at a potentially remote location) which has connected thereto a system control module 910. An external print buffer 912 is connected to PC 908 to provide management the ability to print reports.

In operation, each of TQMSs 900 is located at a different geographical location of the telephone network. And each of TQMSs 900 can test PSTN 904. System control module 910, together with network server 906, would poll the remote TQMSs, and upload the data recorded by those evaluation units, and compress the same. The compressed data can be retrieved from network server 906 by remote PC 908 for generating the necessary reports, thereby enabling management to evaluate the characteristics of the telephone network. In addition to polling and compressing the uploaded data, network server is also capable of archiving the retrieved data by storing the same in removable memories, as for example the removable hard disk 914. Of course, the functions of remote PC 908 may include the maintenance of a database from which phone numbers, commands and other input and output files may be edited. Such edited files may be sent to network server 906, which in turn can upload the updated data files to the remote TQMSs 900s. Albeit only one remote PC 908 is shown, it should be appreciated that, in actuality, a plurality of such remote PCs are available.

To enable the remote TQMSs 900, network server 906 and remote PCs 908 to work in synchronization, a time control file is used with the system to maintain synchronization of the different internal clocks of the different computers. The uploading and downloading of data are conventional, as a myriad of communication programs (such as PC anywhere, Commute or Carbon Copy etc.)are available. Accordingly, such uploading and downloading will not be further described herein. Also will not be discussed herein are the compression of the retrieved data and archiving of the same, inasmuch as those functions, and programs for achieving those functions are conventional and well known.

In summation, the present invention system, by having a multiple number of remotely located evaluation units and at least one centrally located network server, as well as remote terminals, is able to interactively monitor the goings on of the telephone communication network and provide data representative of the characteristics of the telephone network to operators (and management) of the system. With each of the evaluation units operable without human intervention, the present invention system provides for an inexpensive system that continuously monitors the integrity of the telephone network.

Inasmuch as the present invention is subject to many variations, modifications, and changes in detail, it is intended that all matter described throughout this specification and shown in the accompanying drawings be interpreted as illustrative only and not in a limiting sense. Accordingly, it is intended that the invention be limited only by the spirit and scope of the appended claims.

We claim:

1. A telephone call progress evaluation apparatus, comprising;
   means for automatically placing a call to at least one destination at a certain time according to a schedule;
   means for monitoring the progress of said call;
   means for discriminating any one of various possible progress tones and responses from said destination;
   means for corresponding with said destination, said corresponding means continues to correspond with said destination until a perceived final response is received from said destination;
   means for recording the time of occurrence of said any response;
   means for recording at least one portion of said any response, said one portion contributable to the selection of an appropriate reply to said any response during communication between said corresponding means and said destination;
   means for storing said reply;
   wherein said recording means further records any progress tone discriminated by said discriminating means and said storing means stores said any progress tone recorded by said recording means, said apparatus further comprising:
   means for converting said occurrence time, tone and response to respective data;
   means for compressing said data to provide for compact storage and transport.

2. The apparatus of claim 1, further comprising:
   means communicating with a remote control unit for transporting said data compressed by said compressing means to said control unit.

3. The apparatus of claim 2, wherein said remote control unit comprises:
   means for utilizing said data compressed by said compressing means to generate reports to evaluate at least the responsiveness of said destination;
   means for storing said reports for future reference.

4. The apparatus of claim 1, wherein said progress tones and responses comprise:
   at least dial tone signal, busy signal, ring back signal, bong signal, beep signal, PBX signal, responder signal, fax signal, modem signal, and voice.

5. A system for evaluating a telephone network, comprising:
   (a) at least one call progress evaluation unit for automated telephone call testing having
      means for automatically placing a call to at least one destination at a certain time according to a schedule;
      means for monitoring the progress of said call;
      means for discriminating any occurring progress tones and any response from said destination; and
      neans for interactively corresponding with said destination;
   (b) means for storing said any response as data; and
   (c) a data collecting and analyzing unit remotely located from said evaluation unit having
      means remotely communicating with said evaluation unit for retrieving data at least representative of said any response from said destination; and
      means utilizing said data retrieved by said remotely communicating means and representative of said any response from said destination to determine predefined characteristics of said telephone network relating to said at least one destination.

6. The system of claim 5, wherein said monitoring means further comprises:
   means for recording the time of occurrence of said any response;
   means for recording at least one portion of said any response, said one portion contributable to the selection of an appropriate reply to said response during communication between said interactive corresponding means and said destination;
   means for storing said reply.

7. The system of claim 6, wherein said recording means further records any progress tone discriminated by said discriminating means and said storing means stores said any progress tone recorded by said recording means, said system comprising:
   means for converting said occurrence time tone and response to respective data;
   means for compressing said data to provide for compact storage and transport.

8. The system of claim 5, wherein said progress tones and response comprise:
   at least dial tone signal, busy signal, ring back signal, bong signal, beep signal, PBX signal, responder signal, :fax signal, modem signal, and voice.

9. The system of claim 5, wherein said discrimination means comprises a plurality of programmable filters.

10. A method of evaluating characteristics of a telephone network, comprising the steps of:
    (a) storing a schedule of calls to be made to selected destinations at respective predetermined times;
    (b) placing a call to one of said destinations;
    (c) monitoring the progress of said call;
    (d) discriminating any occurring progress tones and any responses from said destination;
    (e) corresponding with said destination in response to any response from said destination until a perceived final response is received from said destination;
    (f) recording said any response from said destination; and
    (g) utilizing said recorded response to evaluate the characteristics of said telephone network.

11. The method of claim 10, further comprising the steps of:

(h) recording at least one portion of said any response during step (e);

(i) using said one portion to contribute to the selection of an appropriate reply to said any response during step (e).

12. The method of claim 10, further comprising the steps of:

(j) recording the time of occurrence of said any response;

(k) recording any progress tone;

(l) converting said recorded time, tone and response to respective data;

(m) compressing said data to provide for compact storage and transport.

13. The method of claim 12, further comprising the steps of:

(n) transporting said data to a remote control unit;

(o) utilizing said transported data to generate reports to evaluate at least the responsiveness of said destination to calls;

(p) storing said reports for future reference.

14. The method of claim 10, wherein said step (e) further includes the step of generating reports indicative of at least the responsiveness of said destination to calls directed thereto.

* * * * *